United States Patent
Manolakos et al.

(10) Patent No.: US 11,843,964 B2
(45) Date of Patent: Dec. 12, 2023

(54) PRIORITIZATION OF POSITIONING-RELATED REPORTS IN UPLINK

(71) Applicant: QUALCOMM Incorporated, San Diego, CA (US)

(72) Inventors: Alexandros Manolakos, Escondido, CA (US); Sony Akkarakaran, Poway, CA (US); Jingchao Bao, San Diego, CA (US); Weimin Duan, San Diego, CA (US); Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 125 days.

(21) Appl. No.: 17/483,201

(22) Filed: Sep. 23, 2021

(65) Prior Publication Data

US 2022/0124535 A1 Apr. 21, 2022

Related U.S. Application Data

(60) Provisional application No. 63/092,477, filed on Oct. 15, 2020.

(51) Int. Cl.
*H04W 4/00* (2018.01)
*H04W 24/10* (2009.01)
(Continued)

(52) U.S. Cl.
CPC .......... *H04W 24/10* (2013.01); *H04B 17/318* (2015.01); *H04B 17/345* (2015.01);
(Continued)

(58) Field of Classification Search
CPC ..... H04W 24/10; H04W 24/04; H04W 64/00; H04W 28/04; H04W 72/04;
(Continued)

(56) References Cited

U.S. PATENT DOCUMENTS 11,523,364 B2 * 12/2022 Manolakos ........... H04W 48/12
11,689,938 B2 *  6/2023 Franke .................. H04W 24/10
                                                     375/262

(Continued)

OTHER PUBLICATIONS

International Search Report and Written Opinion—PCT/US2021/051901—ISA/EPO—dated Feb. 24, 2022.
(Continued)

*Primary Examiner* — Phuongchau Ba Nguyen
(74) *Attorney, Agent, or Firm* — QUALCOMM Incorporated

(57) ABSTRACT

Disclosed are various techniques for wireless communication. In an aspect, a user equipment (UE) identifies a set of positioning sources, each positioning source comprising a positioning reference signal (PRS) resource, a PRS resource set, a PRS frequency layer, and/or a transmission/reception point (TRP). From the set of positioning sources, the UE identifies a consistency group comprising a collection of positioning sources grouped based on expected values of at least one metric of a reference signal from each positioning source, measured values of the at least one metric for the reference signal from each positioning source, and an error threshold. The UE identifies one or more subsets of positioning sources within the consistency group, each subset having at least one metric error value. The UE reports, to a network entity, information about the consistency group and information about at least one of the subsets of positioning sources within the consistency group.

28 Claims, 16 Drawing Sheets

(51) Int. Cl.
*H04L 5/00* (2006.01)
*H04L 43/0864* (2022.01)
*H04B 17/345* (2015.01)
*H04B 17/391* (2015.01)
*H04B 17/318* (2015.01)

(52) U.S. Cl.
CPC ......... *H04B 17/391* (2015.01); *H04L 5/0048* (2013.01); *H04L 43/0864* (2013.01)

(58) Field of Classification Search
CPC ... H04W 72/042; H04W 88/08; H04W 28/08; H04W 28/084; H04W 36/22; H04W 72/12; H04B 17/318; H04B 17/345; H04B 17/391; H04B 17/364; H04L 25/0224; H04L 41/147; H04L 43/06; H04L 43/16; H04L 43/20; H04L 41/0893; H04L 43/022; H04L 43/0823; H04L 5/0007; G01S 5/0244; G01S 7/006; G01S 7/2883; G01S 13/106; G01S 13/26; G01S 13/288; G01S 13/765; G01S 13/878; G01S 5/0218

See application file for complete search history.

(56) References Cited

U.S. PATENT DOCUMENTS

2020/0296680 A1 9/2020 Akkarakaran et al.
2020/0367193 A1* 11/2020 Cha .................. H04W 48/12
2022/0095265 A1* 3/2022 Cha .................. H04W 64/00
2022/0146620 A1* 5/2022 Alawieh ............ H04L 5/0051
2022/0174641 A1* 6/2022 Cha .................. H04L 5/005

OTHER PUBLICATIONS

Moderator(Intel Corp):"Feature Lead Summary#2 Email Discussion[102-e-NR-Pos-Enh-Eval-Acc-Lat]",3GPP Draft,3GPP TSG RAN WG1 Mtg #102-E,R1-2007262,3rd Gen Partnership Project(3GPP)Mobile Comp Centre,650, Route Des Lucioles, F-06921 Sophia-Antipolis Cedex, FR,vol. RAN WG1,No. e-Mtg,Aug. 17, 2020 Aug. 28, 2020,Aug. 26, 2020 (Aug. 26, 2020)XP051922064,73 Pgs,Retrieved Internet:URL:https://ftp.3gpp.org/tsg_ran/WG1_RL1/TSGR1_102-e/Docs/R1-2007262.zip R1-2007262_Summary 2f[102-e-NR-Pos-Enh-Eval-Acc-Lat].docx[Retrieved Aug. 26, 2020]Whole Doc.

Qualcomm Incorporated: "Initial Evaluation of Achievable Positioning Accuracy", 3GPP Draft, 3GPP TSG RAN WG1 #101-e, R1-2004491, 3rd Generation Partnership Project (3GPP), Mobile Competence Centre, 650, Route Des Lucioles, F-06921 Sophia-Antipolis Cedex, France, vol. RAN WG1, No. e-meeting, May 25, 2020-Jun. 5, 2020, May 16, 2020 (May 16, 2020), XP051886220, 21 Pages, Retrieved from the Internet: URL: https://ftp.3gpp.org/tsg_ran/WG1_RL1/TSGR1_101-e/Docs/R1-2004491.zip. R1-2004491.docx. [Retrieved on May 16, 2020] Section 3.

* cited by examiner

PRIORITIZATION OF POSITIONING-RELATED REPORTS IN UPLINK

CROSS-REFERENCE TO RELATED APPLICATION

This application claims priority to U.S. Provisional Patent Application No. 63/092,477, filed Oct. 15, 2020, entitled "PRIORITIZATION OF POSITIONING-RELATED REPORTS IN UPLINK," which is assigned to the assignee hereof and is expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communication (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes identifying a set of positioning sources, each positioning source comprising a positioning reference signal (PRS) resource, a PRS resource set, a PRS frequency layer, a transmission/reception point (TRP), or a combination thereof; identifying, from the set of positioning sources, positioning sources that form a consistency group, the consistency group comprising a collection of positioning sources grouped based on an expected value of at least one metric of a reference signal from each positioning source, a measured value of the at least one metric for the reference signal from each positioning source, and an error threshold; identifying one or more subsets of positioning sources within the consistency group, each subset having at least one metric error value; and reporting, to a network entity, information about the consistency group and information about at least one of the subsets of positioning sources within the consistency group.

In an aspect, a method of wireless communication performed by a base station includes receiving, from a network entity, a set of positioning sources, each positioning source comprising a PRS resource, a PRS resource set, a PRS frequency layer, a TRP, or a combination thereof; sending, to a UE, the set of positioning sources; receiving, from the UE, information about a consistency group and information about at least one subset of positioning sources within the consistency group, the consistency group comprising a collection of positioning sources grouped based on an expected value of at least one metric of a reference signal from each positioning source, a measured value of the at least one metric for the reference signal from each positioning source, and an error threshold; and sending, to the network entity, the information about the consistency group and the information about the at least one subset of positioning sources within the consistency group.

In an aspect, a method of wireless communication performed by a network entity includes sending, to a base station, a set of positioning sources, each positioning source comprising a PRS resource, a PRS resource set, a PRS frequency layer, a TRP, or a combination thereof; and receiving, from the base station, information about a consistency group and information about at least one subset of positioning sources within the consistency group, the consistency group comprising a collection of positioning sources grouped based on an expected value of at least one metric of a reference signal from each positioning source, a measured value of the at least one metric for the reference signal from each positioning source, and an error threshold.

In an aspect, a UE includes a memory; at least one transceiver; and at least one processor communicatively coupled to the memory and the at least one transceiver, the at least one processor configured to: identify a set of positioning sources, each positioning source comprising a PRS resource, a PRS resource set, a PRS frequency layer, a TRP, or a combination thereof; identify, from the set of positioning sources, positioning sources that form a consistency group, the consistency group comprising a collection of positioning sources group based on an expected value of at least one metric of a reference signal from each positioning source, a measured value of the at least one metric for the reference signal from each positioning source, and an error threshold; identify one or more subsets of positioning sources within the consistency group, each subset having at least one metric error value; and report, to a network entity, information about the consistency group and information about at least one of the subsets of positioning sources within the consistency group.

In an aspect, a base station (BS) includes a memory; at least one transceiver; and at least one processor communicatively coupled to the memory and the at least one transceiver, the at least one processor configured to: receive, via the at least one transceiver, from a network entity, a set of positioning sources, each positioning source comprising a PRS resource, a PRS resource set, a PRS frequency layer, a TRP, or a combination thereof; send, via the at least one transceiver, to a UE, the set of positioning sources; receive, via the at least one transceiver, from the UE, information about a consistency group and information about at least one subset of positioning sources within the consistency group, the consistency group comprising a collection of positioning sources grouped based on an expected value of at least one metric of a reference signal from each positioning source, a measured value of the at least one metric for the reference signal from each positioning source, and an error threshold; and send, via the at least one transceiver, to the network entity, the information about the consistency group and the information about the at least one subset of positioning sources within the consistency group.

In an aspect, a network entity includes a memory; at least one transceiver; and at least one processor communicatively coupled to the memory and the at least one transceiver, the at least one processor configured to: send, via the at least one transceiver, to a base station, a set of positioning sources, each positioning source comprising a PRS resource, a PRS resource set, a PRS frequency layer, a TRP, or a combination thereof; and receive, via the at least one transceiver, from the base station, information about a consistency group and information about at least one subset of positioning sources within the consistency group, the consistency group comprising a collection of positioning sources grouped based on an expected value of at least one metric of a reference signal from each positioning source, a measured value of the at least one metric for the reference signal from each positioning source, and an error threshold.

In an aspect, a UE includes means for identifying a set of positioning sources, each positioning source comprising a PRS resource, a PRS resource set, a PRS frequency layer, a TRP, or a combination thereof; means for identifying, from the set of positioning sources, positioning sources that form a consistency group, the consistency group comprising a collection of positioning sources means for grouping based on an expected value of at least one metric of a reference signal from each positioning source, a measured value of the at least one metric for the reference signal from each positioning source, and an error threshold; means for identifying one or more subsets of positioning sources within the consistency group, each subset having at least one metric error value; and means for reporting, to a network entity, information about the consistency group and information about at least one of the subsets of positioning sources within the consistency group.

In an aspect, a BS includes means for receiving, from a network entity, a set of positioning sources, each positioning source comprising a PRS resource, a PRS resource set, a PRS frequency layer, a TRP, or a combination thereof; means for sending, to a UE, the set of positioning sources; means for receiving, from the UE, information about a consistency group and information about at least one subset of positioning sources within the consistency group, the consistency group comprising a collection of positioning sources grouped based on an expected value of at least one metric of a reference signal from each positioning source, a measured value of the at least one metric for the reference signal from each positioning source, and an error threshold; and means for sending, to the network entity, the information about the consistency group and the information about the at least one subset of positioning sources within the consistency group.

In an aspect, a network entity includes means for sending, to a base station, a set of positioning sources, each positioning source comprising a PRS resource, a PRS resource set, a PRS frequency layer, a TRP, or a combination thereof; and means for receiving, from the base station, information about a consistency group and information about at least one subset of positioning sources within the consistency group, the consistency group comprising a collection of positioning sources grouped based on an expected value of at least one metric of a reference signal from each positioning source, a measured value of the at least one metric for the reference signal from each positioning source, and an error threshold.

In an aspect, a non-transitory computer-readable medium storing computer-executable instructions that, when executed by a UE, cause the UE to: identify a set of positioning sources, each positioning source comprising a PRS resource, a PRS resource set, a PRS frequency layer, a TRP, or a combination thereof; identify, from the set of positioning sources, positioning sources that form a consistency group, the consistency group comprising a collection of positioning sources group based on an expected value of at least one metric of a reference signal from each positioning source, a measured value of the at least one metric for the reference signal from each positioning source, and an error threshold; identify one or more subsets of positioning sources within the consistency group, each subset having at least one metric error value; and report, to a network entity, information about the consistency group and information about at least one of the subsets of positioning sources within the consistency group.

In an aspect, a non-transitory computer-readable medium storing computer-executable instructions that, when executed by a BS, cause the BS to: receive, from a network entity, a set of positioning sources, each positioning source comprising a PRS resource, a PRS resource set, a PRS frequency layer, a TRP, or a combination thereof; send, to a UE, the set of positioning sources; receive, from the UE, information about a consistency group and information about at least one subset of positioning sources within the consistency group, the consistency group comprising a collection of positioning sources grouped based on an expected value of at least one metric of a reference signal from each positioning source, a measured value of the at least one metric for the reference signal from each positioning source, and an error threshold; and send, to the network entity, the information about the consistency group and the information about the at least one subset of positioning sources within the consistency group.

In an aspect, a non-transitory computer-readable medium storing computer-executable instructions that, when executed by a network entity, cause the network entity to: send, to a base station, a set of positioning sources, each positioning source comprising a PRS resource, a PRS resource set, a PRS frequency layer, a TRP, or a combination thereof; and receive, from the base station, information about a consistency group and information about at least one subset of positioning sources within the consistency group, the consistency group comprising a collection of positioning sources grouped based on an expected value of at least one metric of a reference signal from each positioning source, a measured value of the at least one metric for the reference signal from each positioning source, and an error threshold.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
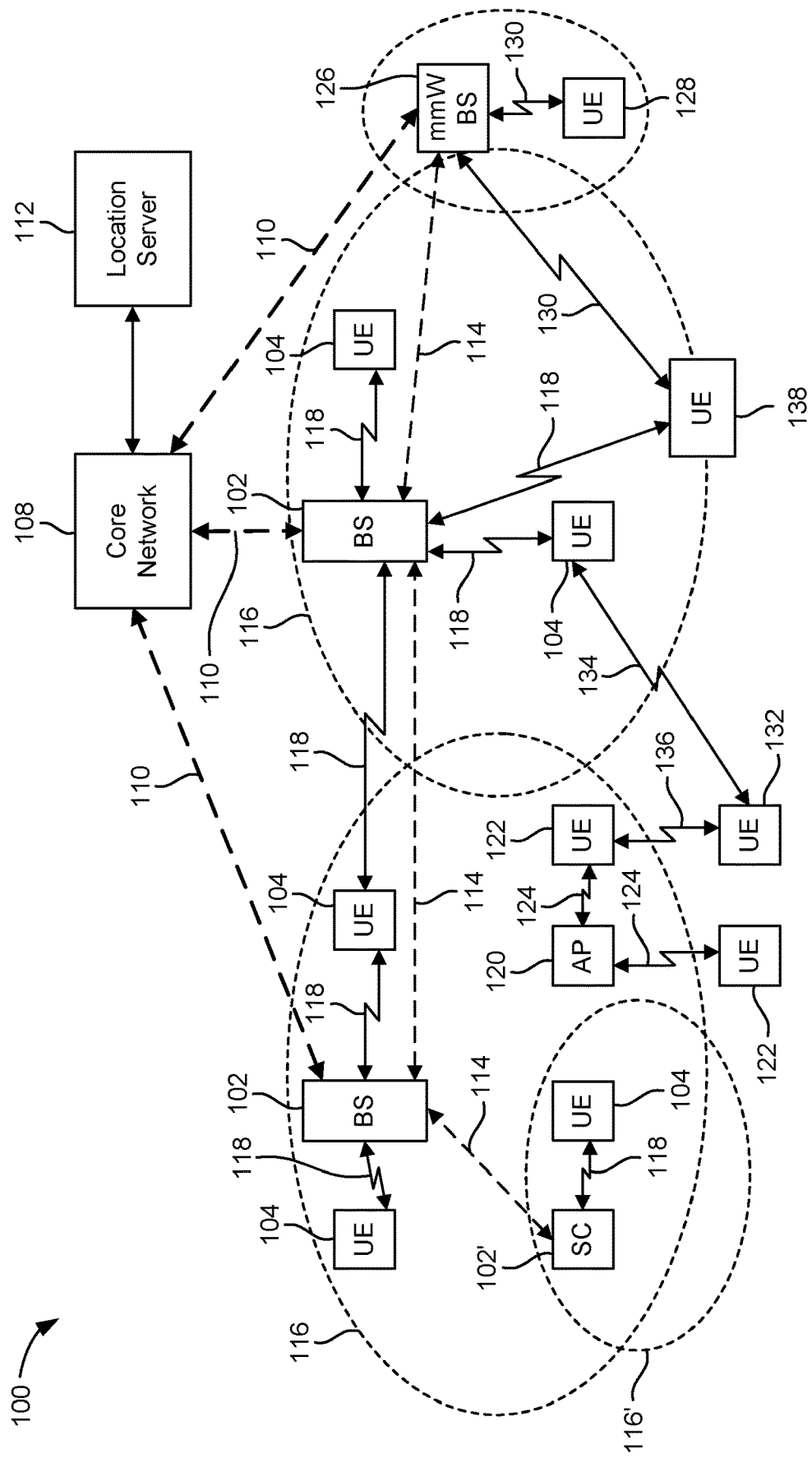
FIG. 1 illustrates an exemplary wireless communications system, according to various aspects.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

To overcome the technical disadvantages of conventional systems and methods described above, mechanisms by which the bandwidth used by a user equipment (UE) for positioning reference signal (PRS) can be dynamically adjusted, e.g., response to environmental conditions, are presented. For example, a UE receiver may indicate to a transmitting entity a condition of the environment in which the UE is operating, and in response the transmitting entity may adjust the PRS bandwidth.

The words "exemplary" and "example" are used herein to mean "serving as an example, instance, or illustration." Any aspect described herein as "exemplary" or "example" is not necessarily to be construed as preferred or advantageous over other aspects. Likewise, the term "aspects of the disclosure" does not require that all aspects of the disclosure include the discussed feature, advantage, or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" (UT), a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network, to the Internet, or to both are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, signaling connections, or various combinations thereof for the supported UEs. In some systems a base station may provide purely edge node signaling functions while in other systems it may provide additional control functions, network management functions, or both. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, signaling connections, or various combinations thereof for UEs), but may instead transmit reference signals to UEs to be measured by the UEs, may receive and measure signals transmitted by the UEs, or both. Such a base station may be referred to as a positioning beacon (e.g., when transmitting signals to UEs), as a location measurement unit (e.g., when receiving and measuring signals from UEs), or both.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an exemplary wireless communications system 100 according to various aspects. The wireless communications system 100 (which may also be referred to as a wireless wide area network (WWAN)) may include various base stations 102 and various UEs 104. The base stations 102 may include macro cell base stations (high power cellular base stations), small cell base stations (low power cellular base stations), or both. In an aspect, the macro cell base station may include eNBs, ng-eNBs, or both, where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a radio access network (RAN) 106 and interface with a core network 108 (e.g., an evolved packet core (EPC) or a 5G core (5GC)) through backhaul links 110, and through the core network 108 to one or more location servers 112 (which may be part of core network 108 or may be external to core network 108). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 114, which may be wired or wireless.

The base stations 102 may wirelessly communicate with the UEs 104. Each of the base stations 102 may provide communication coverage for a respective geographic coverage area 116. In an aspect, one or more cells may be supported by a base station 102 in each geographic coverage area 116. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 116.

While neighboring macro cell base station 102 geographic coverage areas 116 may partially overlap (e.g., in a handover region), some of the geographic coverage areas 116 may be substantially overlapped by a larger geographic coverage area 116. For example, a small cell base station 102' may have a coverage area 116' that substantially overlaps with the geographic coverage area 116 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 118 between the base stations 102 and the UEs 104 may include uplink (also referred to as reverse link) transmissions from a UE 104 to a base station 102, downlink (also referred to as forward link) transmissions from a base station 102 to a UE 104, or both. The communication links 118 may use MIMO antenna technology, including spatial multiplexing, beamforming, transmit diversity, or various combinations thereof. The communication links 118 may be through one or more carrier frequencies. Allocation of carriers may be asymmetric with respect to downlink and uplink (e.g., more, or less carriers may be allocated for downlink than for uplink).

The wireless communications system 100 may further include a wireless local area network (WLAN) access point (AP) 120 in communication with WLAN stations (STAs) 122 via communication links 124 in an unlicensed frequency spectrum (e.g., 5 GHz). When communicating in an unlicensed frequency spectrum, the WLAN STAs 122, the WLAN AP 120, or various combinations thereof may perform a clear channel assessment (CCA) or listen-before-talk (LBT) procedure prior to communicating in order to determine whether the channel is available.

The small cell base station 102' may operate in a licensed, an unlicensed frequency spectrum, or both. When operating in an unlicensed frequency spectrum, the small cell base station 102' may employ LTE or NR technology and use the same 5 GHz unlicensed frequency spectrum as used by the WLAN AP 120. The small cell base station 102', employing LTE/5G in an unlicensed frequency spectrum, may boost coverage to the access network, increase capacity of the access network, or both. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 126 that may operate in mmW frequencies, in near mmW frequencies, or a combination thereof in communication with a UE 128. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 126 and the UE 128 may utilize beamforming (transmit, receive, or both) over a mmW communication link 130 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting, adjust the phase setting, or a combination thereof, of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), narrowband reference signals (NRS) tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/126, UEs 104/128) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/128 and the cell in which the UE 104/128 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/128 in a cell may have different downlink primary carriers. The same is true for the uplink primary carriers. The network is able to change the primary carrier of any UE 104/128 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102, the mmW base station 126, or a combination thereof may be secondary carriers ("SCells"). The simultaneous transmission, reception, or both of multiple carriers enables the UE 104/128 to significantly increase its data transmission rates, reception rates, or both. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 132, that connects indirectly to one or more communication networks via one or more device-to-device (D2D) peer-to-peer (P2P) links (referred to as "sidelinks"). In the example of FIG. 1, UE 132 has a D2D P2P link 134 with one of the UEs 104 connected to one of the base stations 102 (e.g., through which UE 132 may indirectly obtain cellular connectivity) and a D2D P2P link 194 with WLAN STA 122 connected to the WLAN AP 120 (through which UE 132 may indirectly obtain WLAN-based Internet connectivity). In an example, the D2D P2P link 134 and P2P link 136 may be supported with any well-known D2D RAT, such as LTE Direct (LTE-D), WiFi Direct (WiFi-D), Bluetooth®, and so on.

The wireless communications system 100 may further include a UE 138 that may communicate with a macro cell base station 102 over a communication link 118, with the mmW base station 126 over a mmW communication link 130, or a combination thereof. For example, the macro cell base station 102 may support a PCell and one or more SCells for the UE 138 and the mmW base station 126 may support one or more SCells for the UE 138.

Figure 2A:
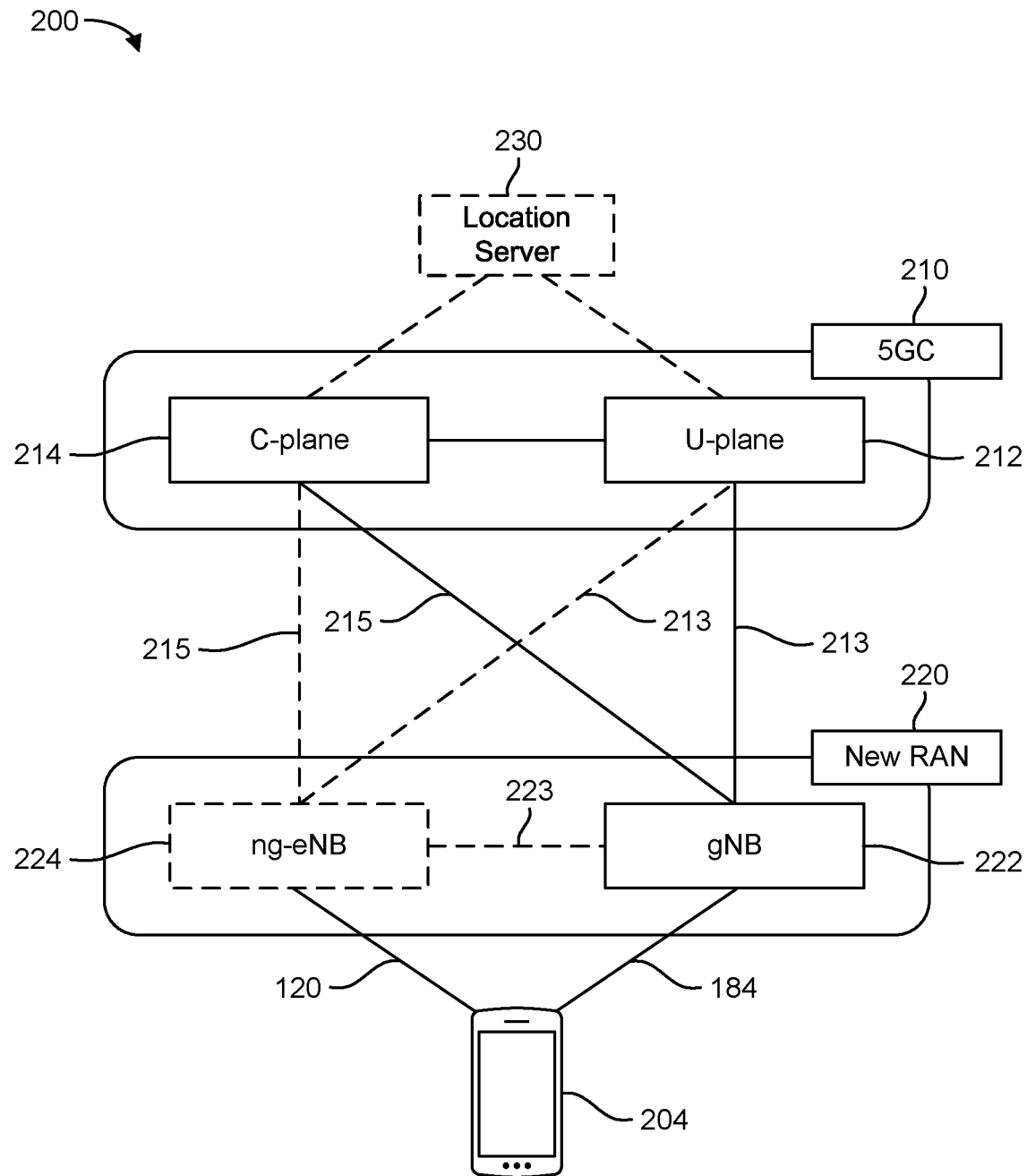
FIGS. 2A and 2B illustrate example wireless network structures, according to various aspects.

FIG. 2A illustrates an example wireless network structure 200 according to various aspects. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include a location server 112, which may be in communication with the 5GC 210 to provide location assistance for UEs 204. The location server 112 can be implemented as a plurality of separate servers (e.g., physically separate servers, different software modules on a single server, different software modules spread across multiple physical servers, etc.), or alternately may each correspond to a single server. The location server 112 can be configured to support one or more location services for UEs 204 that can connect to the location server 112 via the core network, 5GC 210, via the Internet (not illustrated), or via both. Further, the location server 112 may be integrated into a component of the core network, or alternatively may be external to the core network.

Figure 2B:
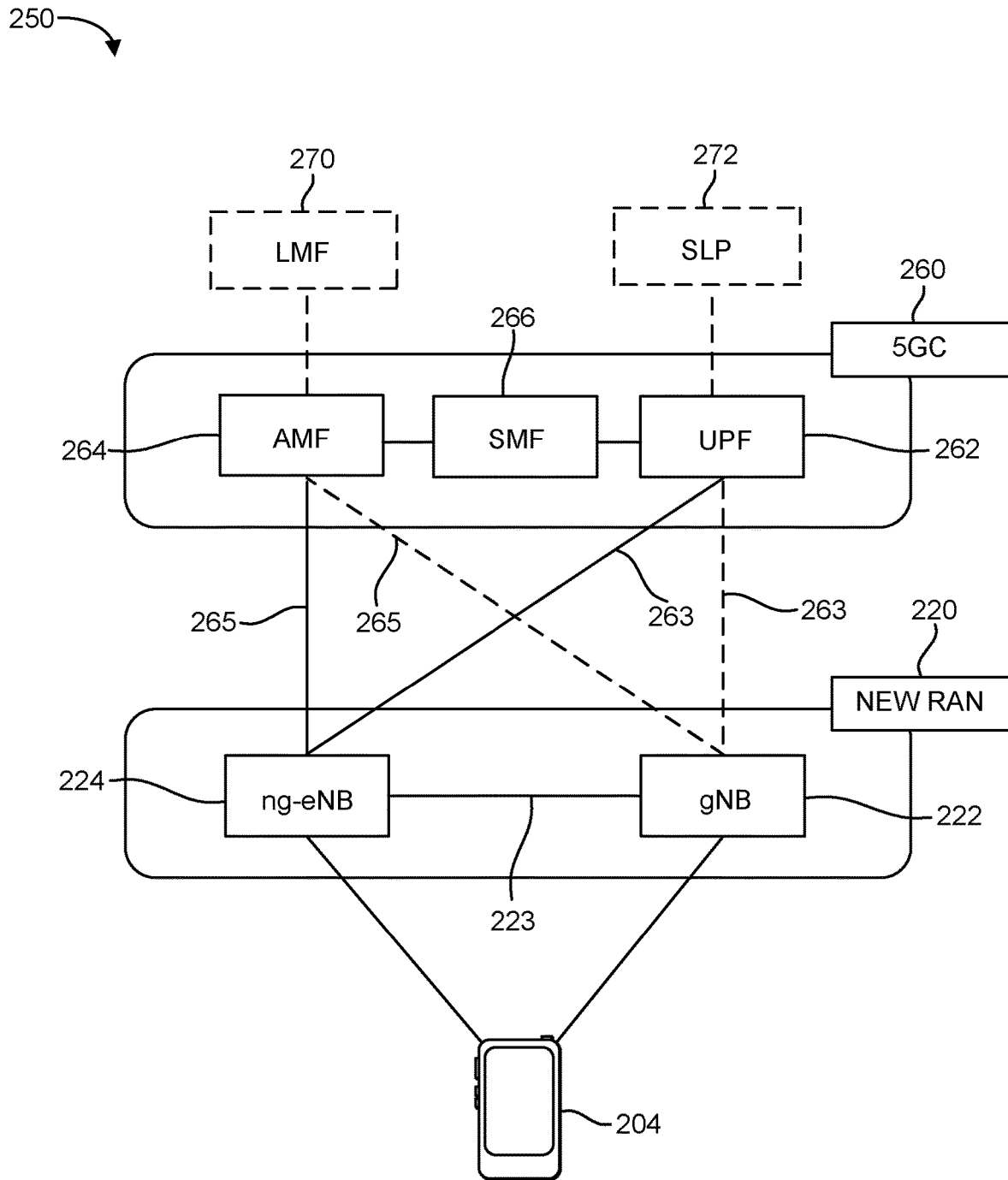

FIG. 2B illustrates another example wireless network structure 250 according to various aspects. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 112), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, via the Internet (not illustrated), or via both. The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice or data like the transmission control protocol (TCP) and/or IP).

In an aspect, the LMF 270, the SLP 272, or both may be integrated into a base station, such as the gNB 222 or the ng-eNB 224. When integrated into the gNB 222 or the ng-eNB 224, the LMF 270 or the SLP 272 may be referred to as a location management component (LMC). However, as used herein, references to the LMF 270 and the SLP 272 include both the case in which the LMF 270 and the SLP 272 are components of the core network (e.g., 5GC 260) and the case in which the LMF 270 and the SLP 272 are components of a base station.

Figure 3A:
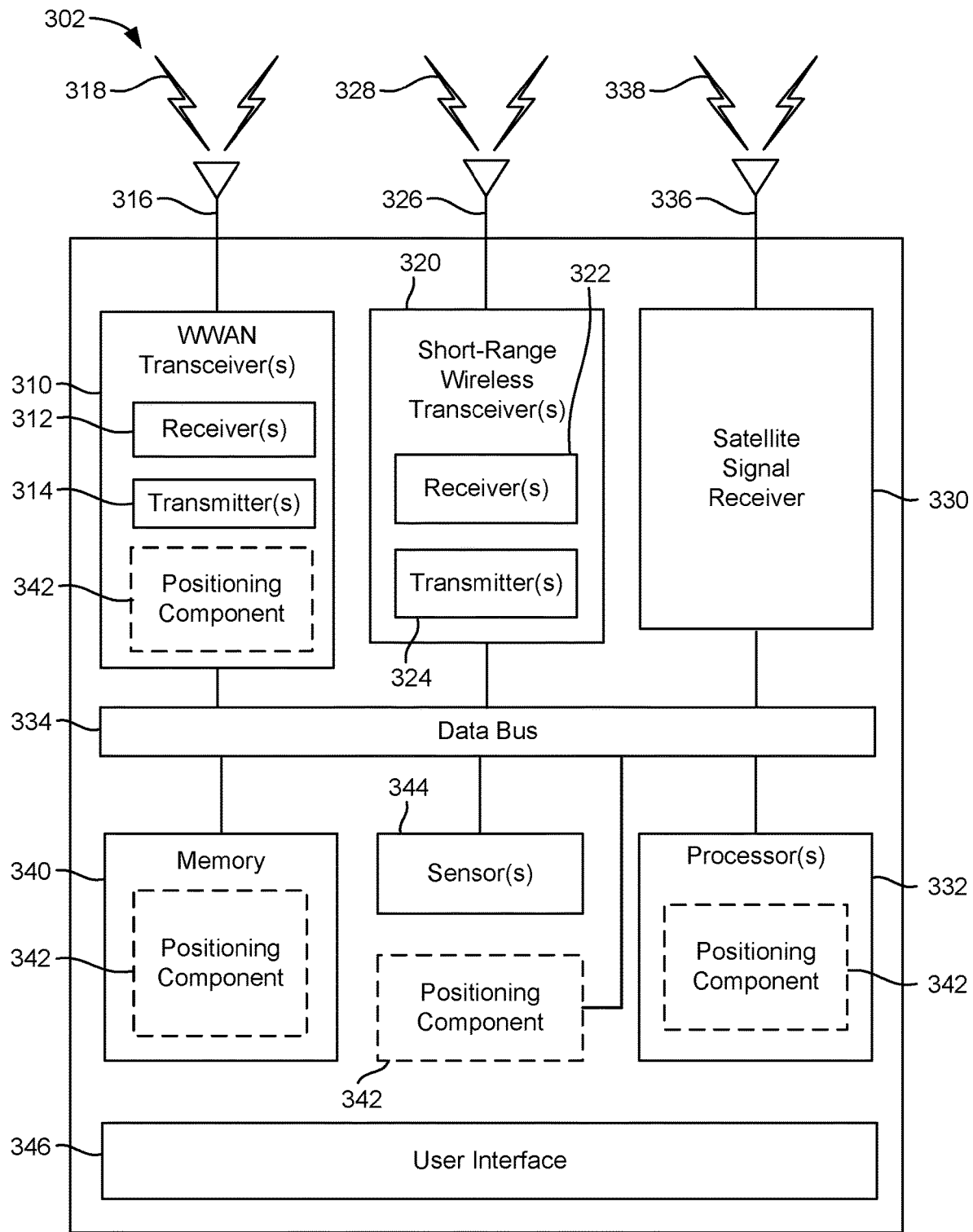
FIGS. 3A, 3B, and 3C are simplified block diagrams of several sample aspects of components that may be employed in a user equipment (UE), a base station, and a network entity, respectively, and configured to support communications as taught herein.
Figure 3B:
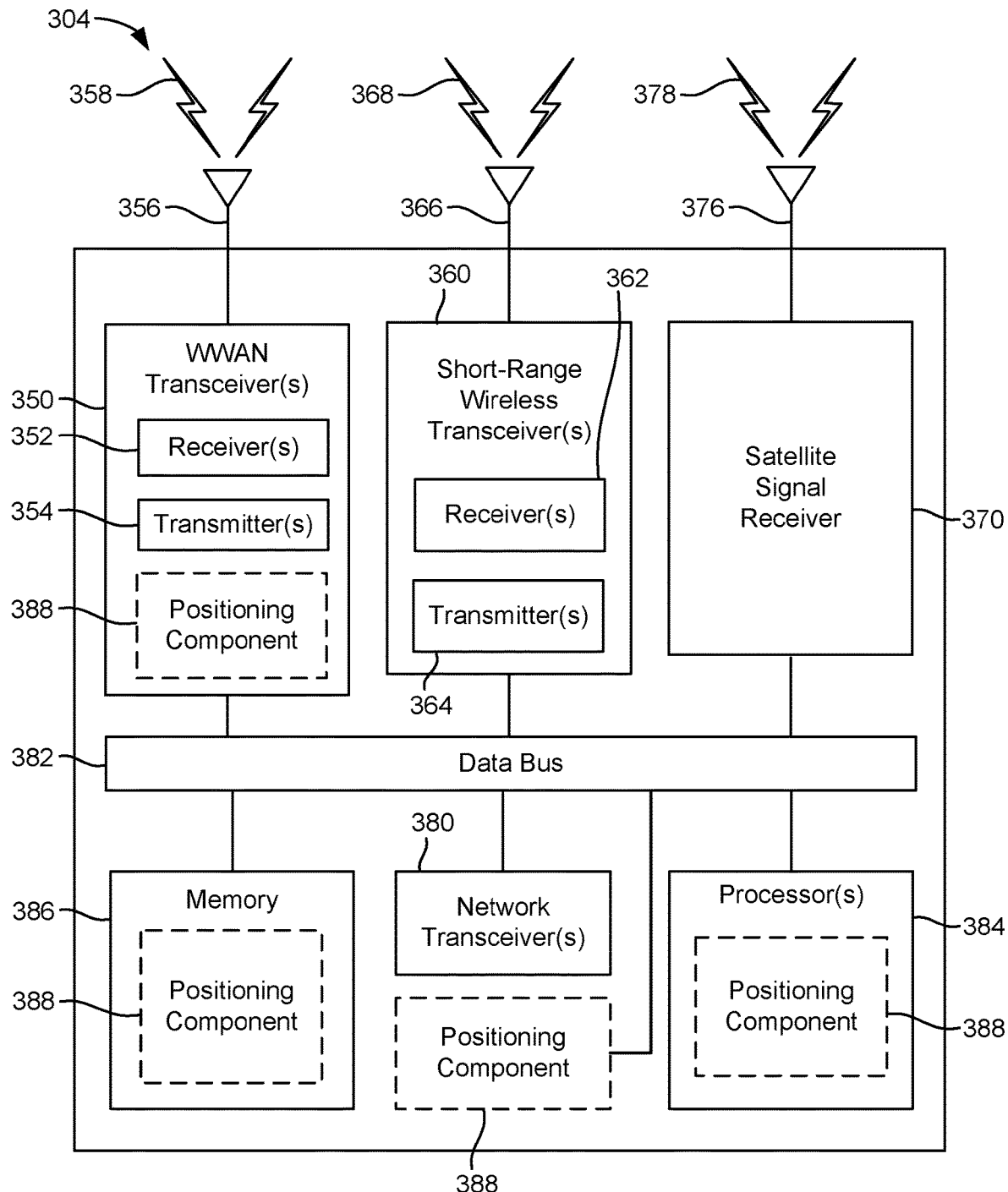
Figure 3C:
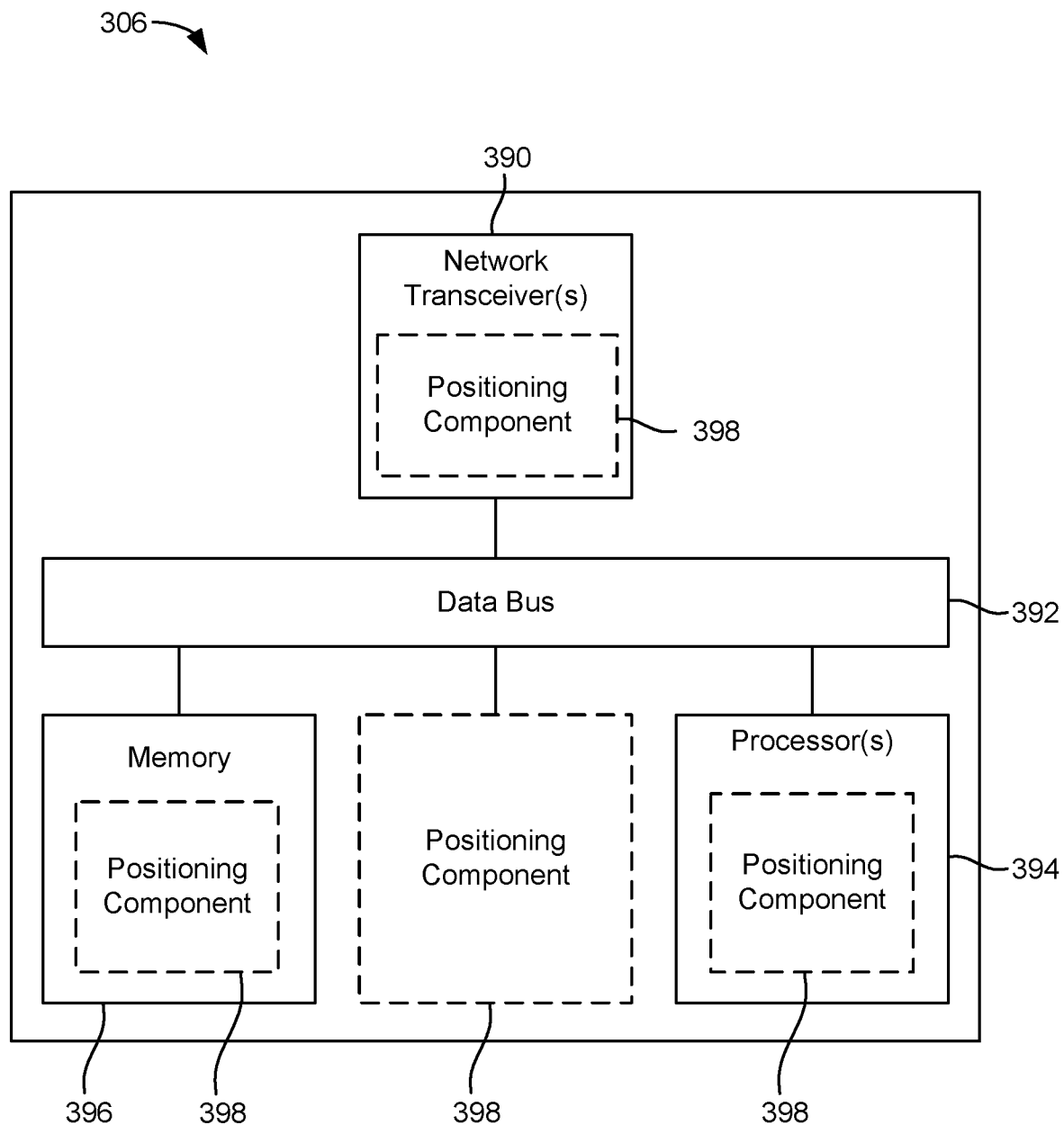

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARM), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

NR supports a number of cellular network-based positioning technologies, including downlink-based, uplink-based, and downlink-and-uplink-based positioning methods. Downlink-based positioning methods include observed time difference of arrival (OTDoA) in LTE, downlink time difference of arrival (DL-TDoA) in NR, and downlink angle-of-departure (DL-AoD) in NR. In an OTDoA or DL-TDoA positioning procedure, a UE measures the differences between the times of arrival (ToAs) of reference signals (e.g., PRS, TRS, narrowband reference signal (NRS), CSI-RS, SSB, etc.) received from pairs of base stations, referred to as reference signal time difference (RSTD) or time difference of arrival (TDoA) measurements, and reports them to a positioning entity. More specifically, the UE receives the identifiers of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location. For DL-AoD positioning, a base station measures the angle and other channel properties (e.g., signal strength) of the downlink transmit beam used to communicate with a UE to estimate the location of the UE.

Uplink-based positioning methods include uplink time difference of arrival (UL-TDoA) and uplink angle-of-arrival (UL-AoA). UL-TDoA is similar to DL-TDoA, but is based on uplink reference signals (e.g., SRS) transmitted by the UE. For UL-AoA positioning, a base station measures the angle and other channel properties (e.g., gain level) of the uplink receive beam used to communicate with a UE to estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements. Based on the propagation time and the known speed of light, the distance between the initiator and the responder can be determined. For multi-RTT positioning, a UE performs an RTT procedure with multiple base stations to enable its location to be triangulated based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base stations.

To assist positioning operations, a location server (e.g., location server 112, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning slots, periodicity of positioning slots, muting sequence, frequency hopping sequence, reference signal identifier (ID), reference signal bandwidth, slot offset, etc.), other parameters applicable to the particular positioning method, or a combination thereof. Alternatively, the assistance data may originate directly from the base stations themselves (e.g., in periodically broadcasted overhead messages, etc.). In some cases, the UE may be able to detect neighbor network nodes itself without the use of assistance data.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Various frame structures may be used to support downlink and uplink transmissions between network nodes (e.g., base stations and UEs).

Figure 4A:
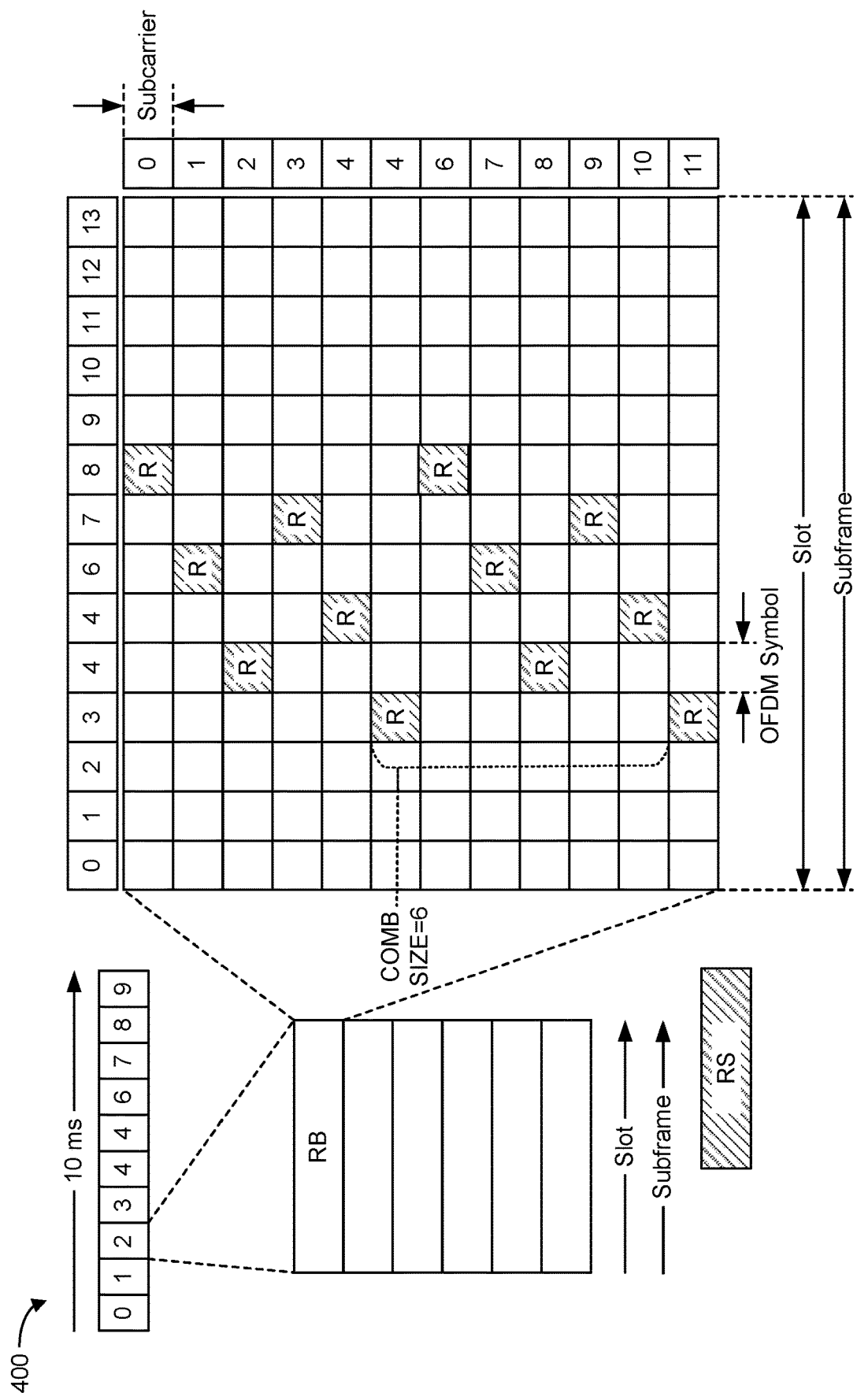
FIGS. 4A and 4B are diagrams illustrating example frame structures and channels within the frame structures, according to aspects of the disclosure.

FIG. 4A is a diagram 400 illustrating an example of a downlink frame structure, according to aspects.

Figure 4B:
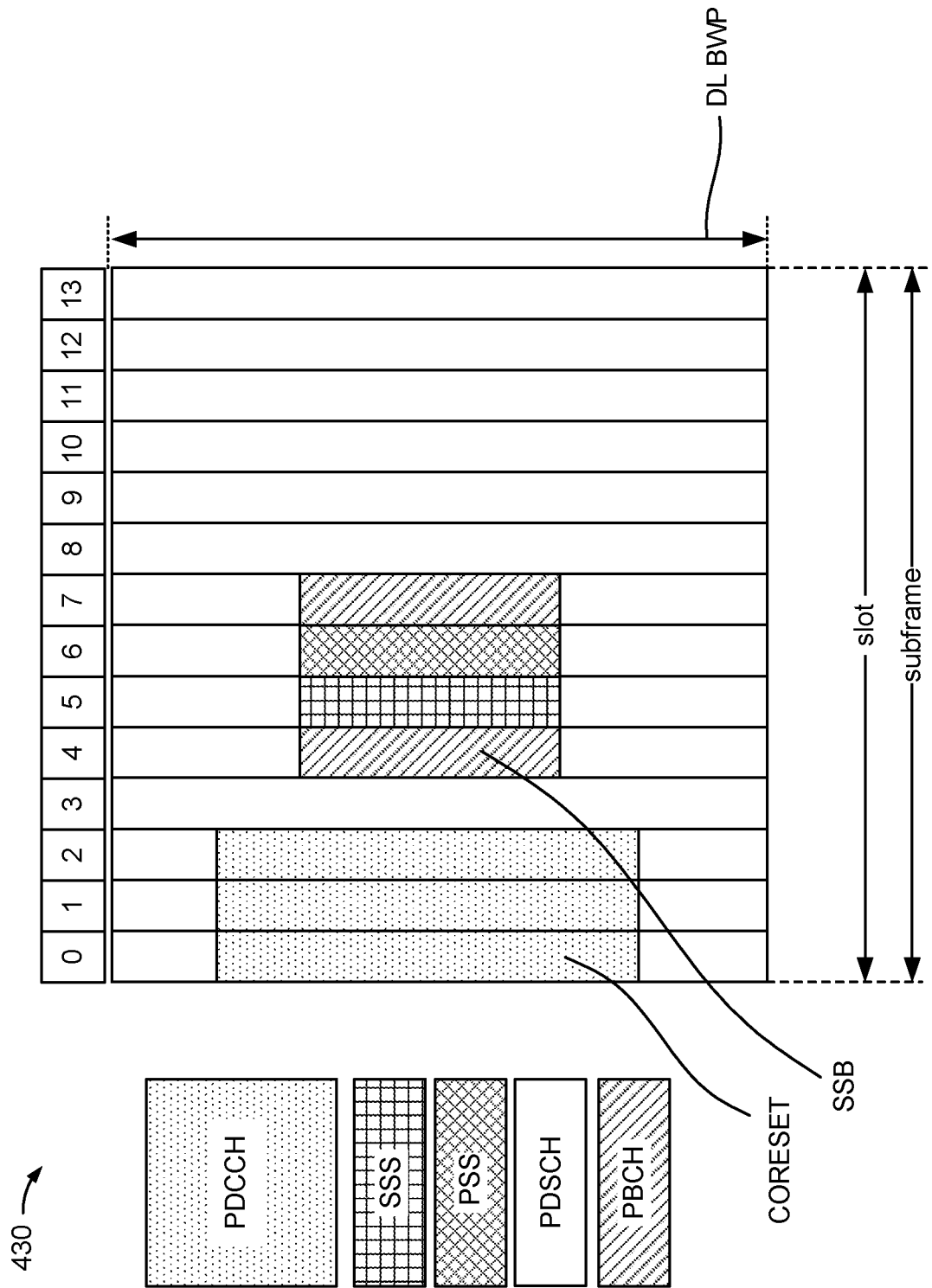

FIG. 4B is a diagram 430 illustrating an example of channels within the downlink frame structure, according to aspects. Other wireless communications technologies may have different frame structures, different channels, or both.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 504, 1024, or 2048 for system bandwidth of 1.25, 2.5, 5, 10, or 20 megahertz (MHz), respectively. The system bandwidth may also be partitioned into subbands. For example, a subband may cover 1.8 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies ($\mu$), for example, subcarrier spacing of 15 kHz, 30 kHz, 60 kHz, 120 kHz, and 240 kHz or greater may be available. Table 1 provided below lists some various parameters for different NR numerologies.

TABLE 1

| $\mu$ | SCS (kHz) | Symbols/ Sot | Slots/ Subframe | Slots/ Frame | Slot Duration (ms) | Symbol Duration ($\mu$s) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 200 |
| 3 | 120 | 14 | 8 | 80 | 0.125 | 8.33 | 400 |
| 4 | 240 | 14 | 16 | 160 | 0.0625 | 4.17 | 800 |

In the example of FIGS. 4A and 4B, a numerology of 15 kHz is used. Thus, in the time domain, a 10 millisecond (ms) frame is divided into 10 equally sized subframes of 1 ms each, and each subframe includes one time slot. In FIGS. 4A and 4B, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In NR, a subframe is 1 ms in duration, a slot is fourteen symbols in the time domain, and an RB contains twelve consecutive subcarriers in the frequency domain and fourteen consecutive symbols in the time domain. Thus, in NR there is one RB per slot. Depending on the SCS, an NR subframe may have fourteen symbols, twenty-eight symbols, or more, and thus may have 1 slot, 2 slots, or more. The number of bits carried by each RE depends on the modulation scheme.

Some of the REs carry downlink reference (pilot) signals (DL-RS). The DL-RS may include PRS, TRS, PTRS, CRS, CSI-RS, DMRS, PSS, SSS, SSB, etc. FIG. 4A illustrates exemplary locations of REs carrying PRS (labeled "R").

A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance, a "positioning occasion," "a positioning instance," a "positioning repetition," or simply an "occasion," an "instance," or a "repetition."

A collection of resource elements (REs) that are used for transmission of PRS is referred to as a "PRS resource." The collection of resource elements can span multiple PRBs in the frequency domain and 'N' (e.g., 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each of the fourth symbols of the PRS resource configuration, REs corresponding to every fourth subcarrier (e.g., subcarriers 0, 4, 8) are used to transmit PRS of the PRS resource. Currently, comb sizes of comb-2, comb-4, comb-6, and comb-12 are supported for DL PRS. FIG. 4A illustrates an exemplary PRS resource configuration for comb-6 (which spans six symbols). That is, the locations of the shaded REs (labeled "R") indicate a comb-6 PRS resource configuration.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (e.g., PRS-ResourceRepetitionFactor) across slots. The periodicity is the time from the first repetition of the first PRS resource of a first PRS instance to the same first repetition of the same first PRS resource of the next PRS instance. The periodicity may have a length selected from $2^{\mu} \cdot \{4, 5, 8, 10, 16, 20, 32, 40, 64, 80, 160, 320, 640, 1280, 2560, 5040, 10240\}$ slots, with $\mu=0, 1, 2, 3$. The repetition factor may have a length selected from $\{1, 2, 4, 6, 8, 16, 32\}$ slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing (SCS) and cyclic prefix (CP) type (meaning all numerologies supported for the PDSCH are also supported for PRS), the same Point A, the same value of the downlink PRS bandwidth, the same start PRB (and center frequency), and the same comb-size. The Point A parameter takes the value of the parameter ARFCN-ValueNR (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

FIG. 4B illustrates an example of various channels within a downlink slot of a radio frame. In NR, the channel bandwidth, or system bandwidth, is divided into multiple BWPs. A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols (although it could be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE. Multiple (e.g., up to eight) DCIs can be configured in the PDCCH, and these DCIs can have one of multiple formats. For example, there are different DCI formats for uplink scheduling, for non-MIMO downlink scheduling, for MIMO downlink scheduling, and for uplink power control. A PDCCH may be transported by 1, 2, 4, 8, or 16 CCEs in order to accommodate different DCI payload sizes or coding rates.

Figure 5:
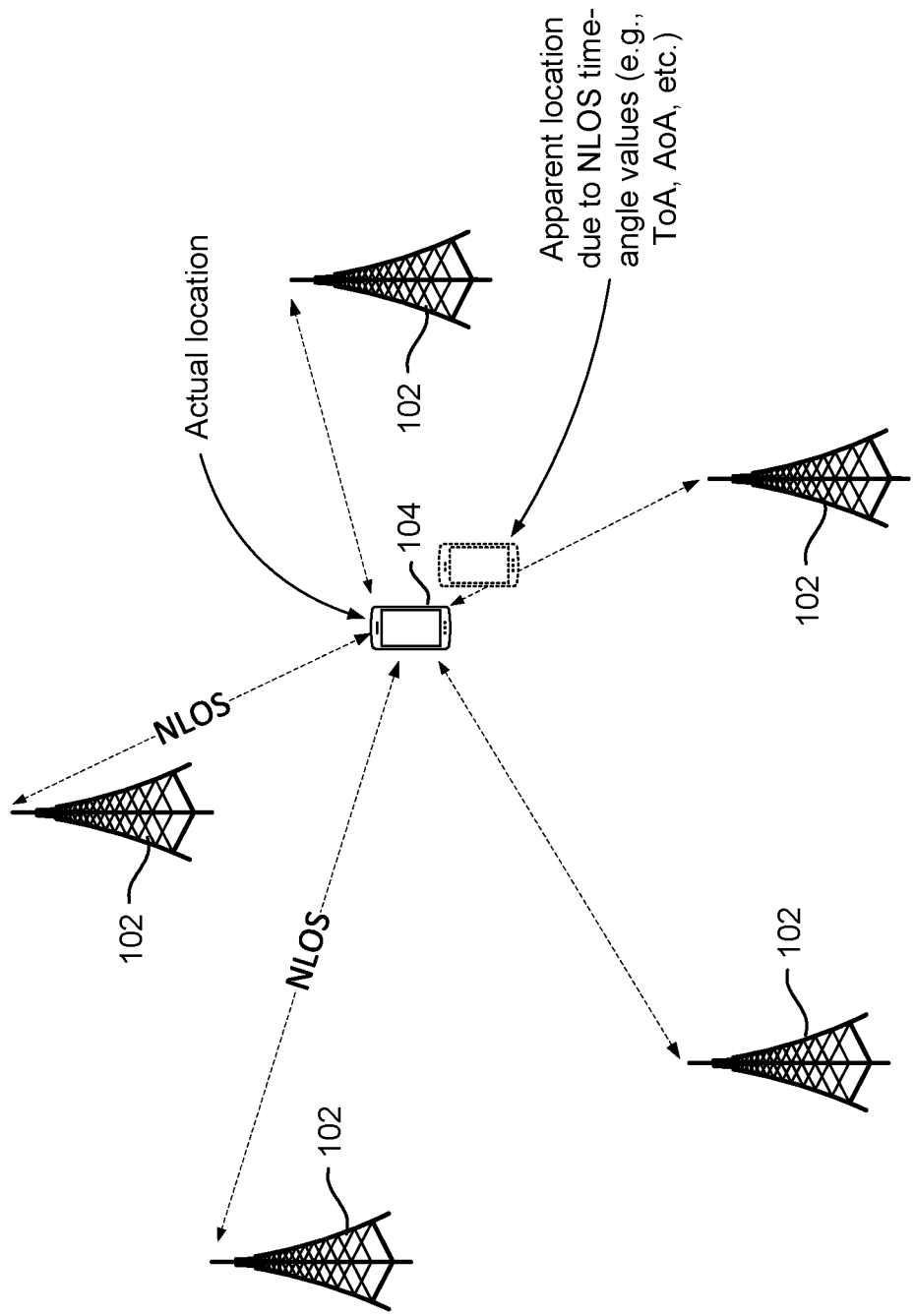
FIG. 5 is a diagram illustrating how a non-line-of-sight (NLOS) positioning signal can cause a user equipment (UE) to miscalculate its position.

FIG. 5 is a diagram illustrating how a non-line-of-sight (NLOS) positioning signal can cause a UE 104 to miscalculate its position. In FIG. 5, the UE 104 operating within an area populated by multiple base stations 102 calculates its position based on time of arrival (ToA) of signals from those base stations 102. The UE 104 knows the geographic locations of the base stations 102, e.g., via receipt of assistance data provided by a location server. The assistance data may also identify PRS resources, PRS resource sets, transmission reception points (TRPs), or a combination thereof, for the UE to use for positioning. For brevity of description, PRS resources, PRS resource sets, TRPs, or a combination thereof, will be collectively referred to herein as "positioning sources." The UE 104 determines its geographic position based on its distance from each of one or more of the base stations 102, which the UE 104 calculates based on the ToA of signals from the particular base station 102 and the speed of a radio signal in air, presuming that the ToA corresponds to the time of flight of a LOS path.

However, if a signal from a base station 102 is an NLOS signal, the signal will have traveled farther than the direct distance to the UE, and so the ToA of the NLOS signal will be later than the ToA of that signal had it been a LOS signal instead of a NLOS signal. This means that if the UE 104 happens to base its positioning estimation on the ToA of a NLOS signal, the artificially long ToA value of the NLOS signal will skew the position calculation such that the UE 104 is in an apparent location that is different from its actual location. Thus, one challenge is to distinguish NLOS signals from LOS signals, so that NLOS signals are excluded from consideration during positioning estimations.

One method to distinguish NLOS signals from LOS signal is outlier detection. Outlier detection analyzes positioning signals from a set of cells to each other to determine which of those cells seem to produce ToA values that are "outliers" compared to ToA values produced by other cells in the cohort. Outlier detection produces what is referred to as a "consistency group", which is a collection of N number of positioning sources that resulted in positioning measurements (e.g., RSTD, RSRP, Rx-Tx) such that using a subset X of those N positioning sources for positioning would result in a position estimate which, if used to estimate the ToA to the remaining N-X positioning sources, would result in a value having a timing error within a threshold T. The size of the consistency group produced by outlier detection on a set of cells can be any value from zero to the size of the entire set of cells being analyzed, but is usually a value somewhere in between.

A computationally complete analysis of the cells in the set to each other would require the comparison of every possible combination of subsets of cells to the remainder of the cells in the cohort, but this is computationally burdensome and impractical for UEs, so a technique called random sampling and consensus (RANSAC) is used instead. This technique analyzes a group of candidate positioning sources to each other in various combinations by randomly selecting a subset of the positioning sources in the group, generating an estimated UE position based on that subset, using that position estimate so generated to predict the ToA timings to the rest of the positioning sources not in that subset, and checking to see how well the predicted ToA matched the actual ToA for each of the positioning sources not in the subset, e.g., by determining whether the difference between the actual and predicted ToA is within a timing error threshold value T. Positioning sources within the error threshold value are referred to as inliers. Positioning sources that are not within the threshold value are referred to as outliers. The number of inliers L is determined for each randomly selected sample.

Since it is possible that one of the positioning sources in the randomly selected subset might be NLOS, which would skew the estimated UE position and thus skew the estimated ToAs to the cells not in that subset, the RANSAC algorithm performs the operations described above multiple times, each time using a different randomly selected subset of positioning sources from the group. After a number of iterations, the subset of positioning sources that produced the largest number of inliers, and those inliers, are reported as the members of the consistency group. The outliers are excluded from the consistency group. The identified consistency group is then used as the pool of positioning sources from which the UE calculates its final estimated position. An example implementation of RANSAC is shown in FIG. 6.

Figure 6:
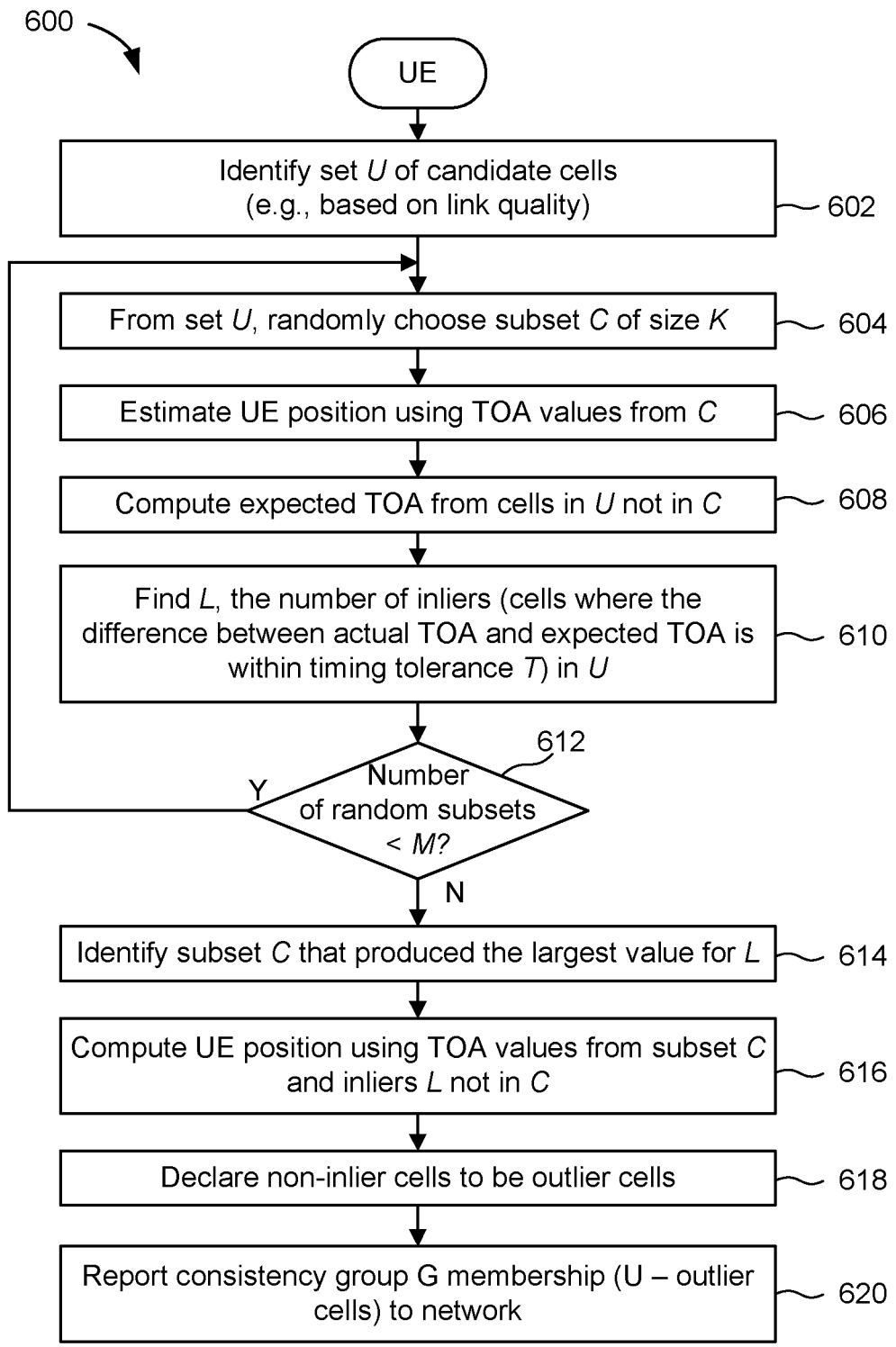
FIG. 6 is a flow chart showing a conventional method for outlier detection.

FIG. 6 is a flow chart showing a conventional method 600 for outlier detection, RANSAC. In FIG. 6, at 602, the UE identifies a set of positioning sources of candidate positioning sources (in this example, a set of cells), e.g., based on link quality. At 604, the UE randomly chooses a subset C of cells, the subset being of size K, e.g., having K number of cells in the subset. At 606, the UE estimates its position using ToA values of the positioning signals from cells in the subset C. At 608, the UE computes the expected ToA from cells in the set of positioning sources not in the subset C. At 610, the UE finds L, the number of inliers (cells where the difference between the actual ToA and the expected ToA is within the timing error tolerance T). At 612, the UE determines whether or not processing of more subsets is needed, e.g., by determining if the number of random subsets is less than the target number of random subsets M. If not, the process repeats starting from 604, with another randomly selected subset of cells, and continues until M subsets have been tested. From there, at 614, the subset C that produced the largest value for L is identified, and at 616, cells in that subset, as well as the inliers found based on that subset, are used to compute the position of the UE. At 618, the non-inlier cells are declared to be outlier cells, and at 620, the UE reports the consistency group membership as the set of positioning sources excluding the outlier cells to the network.

There are disadvantages to the conventional method for identifying outliers described above. One disadvantage is that varying any of the parameters K (size of the random set C), M (number of iterations), and T (tolerance used to distinguish inliers from outliers) can lead to different results.

Another disadvantage is that, because not every possible combination of subsets and remainders was calculated, there is a possibility that not every outlier was identified and excluded from the consistency group, meaning that it is possible that some subset C selected from the consistency group could include a NLOS positioning source, which may lead to a positioning error. For example, the random selection process could select a subset of positioning sources having multiple NLOS errors that happen to cancel each other and produce what seems to be reasonable result, such that the algorithm does not identify the NLOS positioning sources and exclude them from the consistency group that it reports to the network. Likewise, the random selection process could select random groups that, while not exactly the same, are similar enough to each other that coverage of the full set of positioning sources is less than intended, or the number M was effectively not big enough.

Yet another disadvantage is that the conventional method for outlier identification reports the membership of the consistency group, which by definition includes positioning sources whose ToA values are within a threshold margin of error, but does not give an indication of whether the cells in the consistency group easily met the threshold or just barely met the threshold, and does not give any information about whether some groups of positioning sources had better consistency (e.g., the difference between expected and actual ToA was smaller) compared to other groups.

Yet another disadvantage is that not only can an NLOS signal skew the apparent values of ToA, but an NLOS signal can also skew the values of other time-angle metrics, such as RTT, RSTD, time difference of arrival (TDoA), angle of arrival (AoA) and zenith of arrival (ZoA) at the UE 104, as well as angle of departure (AoD) and zenith of departure (ZoD) from the base station 102 for a signal received by the UE 104. Conventional methods, however, do not consider angle measurements, such as AoA, AoD, ZoA, or ZoD, when defining consistency groups.

To address these technical disadvantages, an improved method for identifying outliers is herein presented, wherein in addition to reporting a consistency group that satisfies an error threshold, information about subsets within the consistency group is also provided to the network. Also, the definition of consistency group is expanded to optionally include consistency based on angle, i.e., the error threshold may be a timing error threshold ($E_T$), and angle error threshold ($E_A$), or a combination thereof. Thus, as used herein, the error threshold may refer to a timing error threshold, an angle error threshold, or combinations of both. Where multiple time-angle metrics are considered, in some aspects, each time-angle metric may have its own separate error threshold, there may be an error threshold applied to some combination of time-angle metrics, or a combination thereof.

Figure 7:
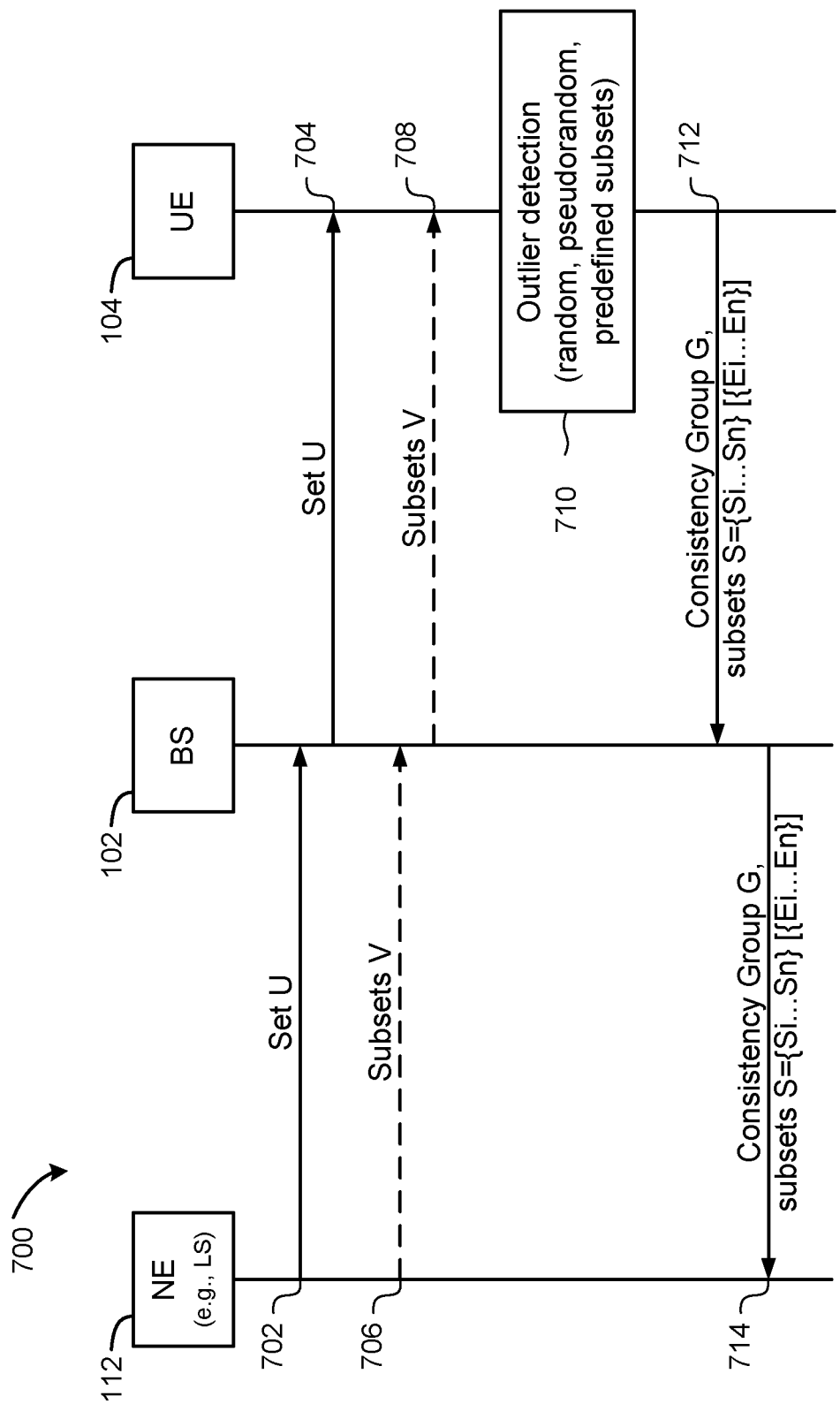
FIG. 7 illustrates a method of wireless communication according to some aspects of the disclosure.

FIG. 7 illustrates a method 700 of wireless communication according to some aspects of the disclosure. In FIG. 7, at 702, a location server 112 or other network entity sends a definition of a set of positioning sources to a base station 102 that is serving a UE 104. At 704, the base station 102 forwards set of positioning sources to the UE 104. In some aspects, at 706, the location server 112 or other network entity may provide a predefined list of subsets of positioning sources within the set of positioning sources, and at 708, the base station 102 forwards the predefined list of subsets of positioning sources to the UE 104. At 710, the UE performs outlier detection according to aspects of the present disclosure, described in more detail below, and at 712, the UE reports the results of the outlier detection, the results including an identified consistency group and a list of at least one subset of the positioning sources within the consistency group, shown in FIG. 7 as {Si . . . Sn}. Optionally, the UE 104 may also provide additional information about each subset, such as their errors {Ei . . . En}, other information, or a combination thereof. At 714, the base station 102 forwards the information to the location server 112 or other network entity.

Figure 8:
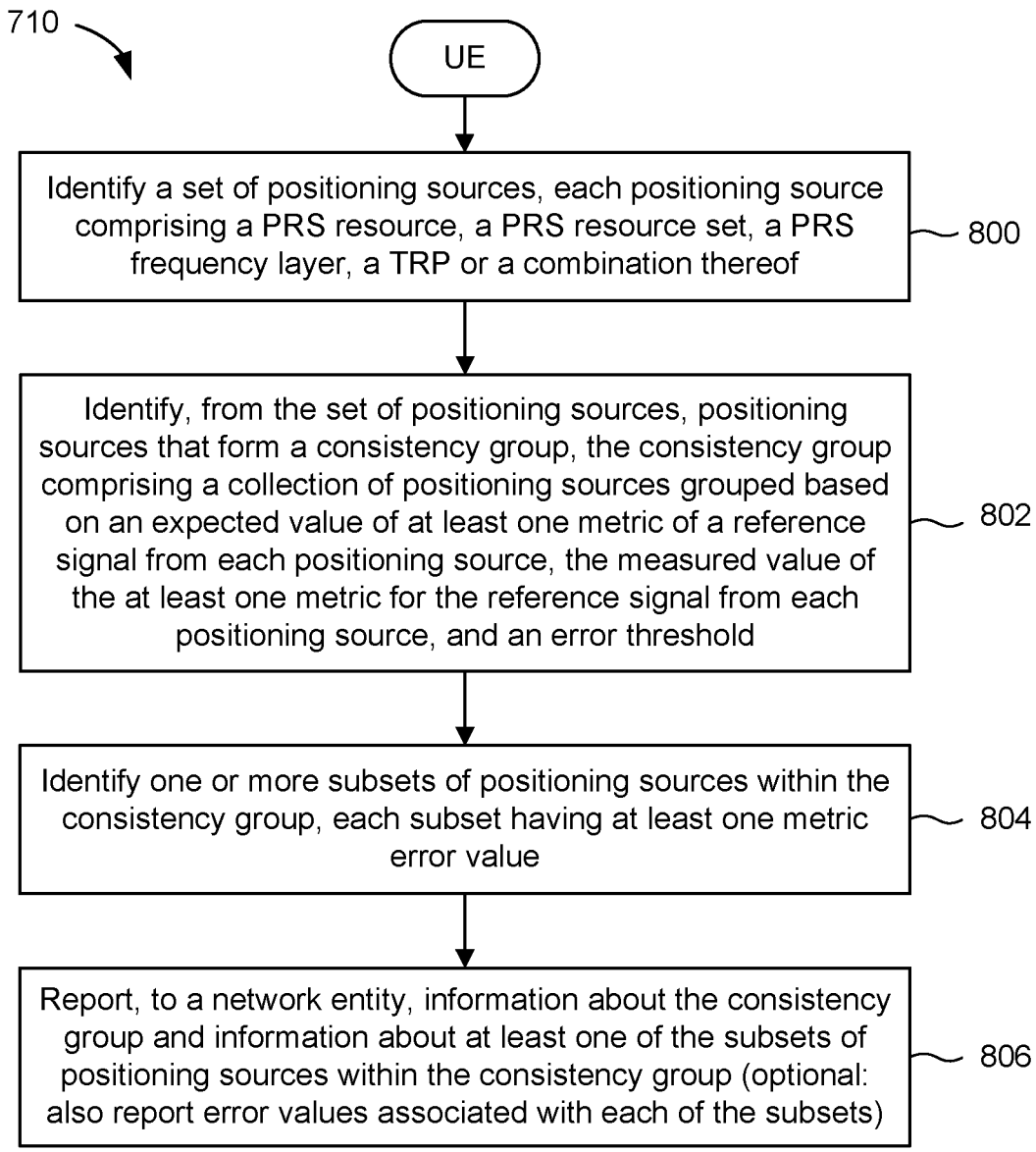
FIGS. 8, 9A, and 9B are flowcharts illustrating partial methods of wireless communication according to some aspects of the disclosure.

FIG. 8 is a flow chart illustrating a portion of method 700, outlier detection 710, in more detail according to aspects of the disclosure. In some implementations, one or more process blocks of FIG. 8 may be performed by a user equipment (UE) (e.g., UE 104). In some implementations, one or more process blocks of FIG. 8 may be performed by another device or a group of devices separate from or including the UE. Additionally, or alternatively, one or more process blocks of FIG. 8 may be performed by one or more components of UE 302, such as processor(s) 332, memory 340, WWAN transceiver(s) 310, short-range wireless transceiver(s) 320, satellite signal receiver 330, sensor(s) 344, user interface 346, and positioning component(s) 342, any or all of which may be means for performing the operations of outlier detection 710.

As shown in FIG. 8, outlier detection 710 may include identifying a set of positioning sources, each positioning source comprising a positioning reference signal (PRS) resource, a PRS resource set, a PRS frequency layer, a transmission/reception point (TRP), or a combination thereof (block 800). Means for performing the operation of block 800 may include the processor(s) 332, memory 340, or WWAN transceiver(s) 310 of the UE 302. For example, the UE 302 may receive the set of positioning sources from a base station, via the receiver(s) 312, or it may retrieve that information previously stored in the memory 340.

As further shown in FIG. 8, outlier detection 710 may include identifying, from the set of positioning sources, positioning sources that form a consistency group, the consistency group comprising a collection of positioning sources that are grouped based on an expected value of at least one metric of a reference signal from each positioning source, a measured value of the at least one metric for the reference signal from each positioning source, and an error threshold (block 802), and may include identifying one or more subsets of positioning sources within the consistency group, each subset having an error value (block 804). In some aspects, the at least one metric comprises a time of arrival (ToA), an angle of arrival (AoA), a zenith of arrival (ZoA), a time difference of arrival (TDoA), a time of departure (ToD), an angle of departure (AoD), a zenith of departure (ZoD), a reference signal time difference (RSTD), a reference signal received power (RSRP), a round-trip time (RTT), or a combination thereof. In some aspects, the error threshold comprises a time-angle threshold. In some aspects, the time-angle threshold may include a timing threshold, an angle threshold, a received power threshold, or a combination thereof. In some aspects, the error threshold may include multiple time-angle thresholds. In some aspects, each member of the consistency group must satisfy at least one of the multiple time-angle thresholds. In some aspects, each member of the consistency group must satisfy all of the multiple time-angle thresholds.

Means for performing the operation of block 802 and block 804 may include the processor(s) 332, memory 340, or WWAN transceiver(s) 310 of the UE 302. For example, in some aspects, the UE 302 may identify positioning source that form a consistency group by using the processor(s) 332, memory 340, and WWAN transceiver(s) 310 to:

perform a sampling operation a number of times M>1, each sampling operation using its own respective sampling subset of the set of positioning sources to identify, as inliers, positioning sources not in the sampling subset that have an error less than the error threshold;

select a sampling subset according to a consensus metric, identifying, as outliers, positioning sources not in the selected sampling subset that do not have an error less than the error threshold;

identify, as the consistency group, the set of positioning sources excluding the outliers, and compute a UE position based on values of one or more time-angle metrics from positioning sources selected from a combination of the selected sampling subset and the inliers identified using the sampling subset that produced the largest number of inliers.

In some aspects, performing the sampling operation comprises selecting, from the set of positioning sources, a sampling subset, estimating, using values for the one or more time-angle metrics from the positioning sources in the sampling subset, a position of the UE, computing expected values for the one or more time-angle metrics from the estimated position of the UE to the positioning sources in set of positioning sources not in the sampling subset, determining a number of inliers associated with the sampling subset, the inliers comprising positioning sources in set of positioning sources not in the sampling subset that have an error less than the error threshold, and determining an error of the inliers, which may be an average error, a maximum error, a minimum error, or other error metric.

In some aspects, selecting the sampling subset from the set of positioning sources comprises selecting positioning sources within the set of positioning sources to comprise the sampling subset randomly, according to a pseudorandom sequence, or from a predefined list of subsets of positioning sources within the set of positioning sources. In some aspects, every sampling subset is a same size. In some aspects, at least one sampling subset is a different size from another sampling subset. In some aspects, the method may include storing the sampling subset, Li, and the error of the inliers.

As further shown in FIG. 8, outlier detection 710 may include reporting, to a network entity, information about the consistency group and information about at least one of the subsets of positioning sources within the consistency group (block 806). Means for performing the operation of block 806 may include the processor(s) 332, memory 340, or WWAN transceiver(s) 310 of the UE 302. For example, the UE 302 may send the report using the transmitter(s) 314. In some aspects, reporting information about at least one of the subsets of positioning sources within the consistency group comprises identifying the positioning sources included in each subset. In some aspects, reporting information about at least one of the subsets of positioning sources within the consistency group comprises reporting an error associated with each subset, reporting an error for each positioning source included in the subset, reporting the error for each positioning source with respect to the error threshold, reporting the error with respect to a consensus value produced by the subset, or a combination thereof. In some aspects, the positioning sources included in each subset are identified completely or differentially, explicitly or implicitly, by index or reference, or a combination thereof. In some aspects, reporting information about at least one of the subsets of positioning sources within the consistency group comprises reporting subsets having an error that satisfies a threshold reporting value.

Outlier detection 710 may include additional implementations, such as any single implementation or any combination of implementations described below and/or in connection with one or more other processes described elsewhere herein. Although FIG. 8 shows example blocks of outlier detection 710, in some implementations, outlier detection 710 may include additional blocks, fewer blocks, different blocks, or differently arranged blocks than those depicted in FIG. 8. Additionally, or alternatively, two or more of the blocks of outlier detection 710 may be performed in parallel.

Figure 9A:
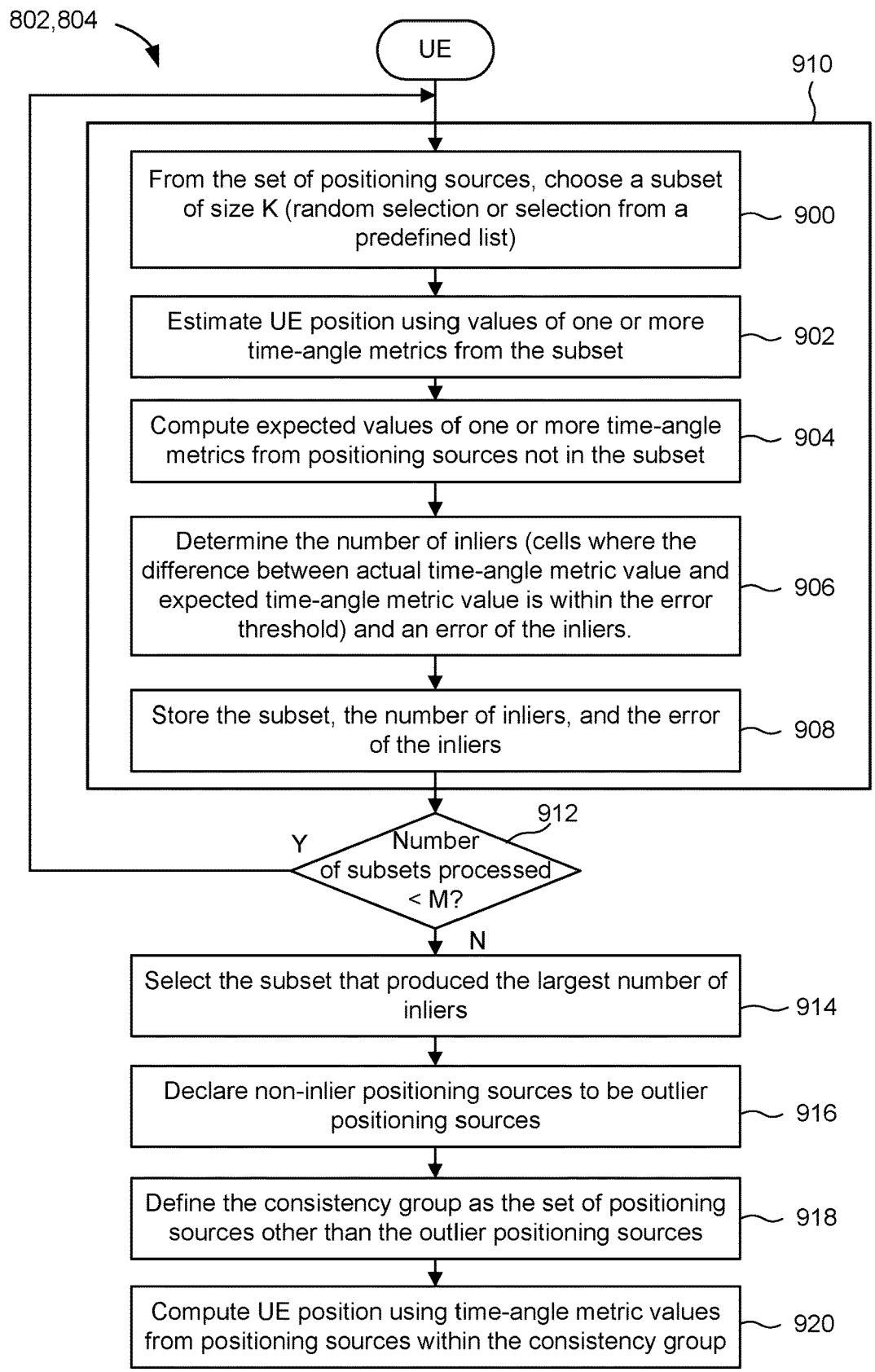
Figure 9B:
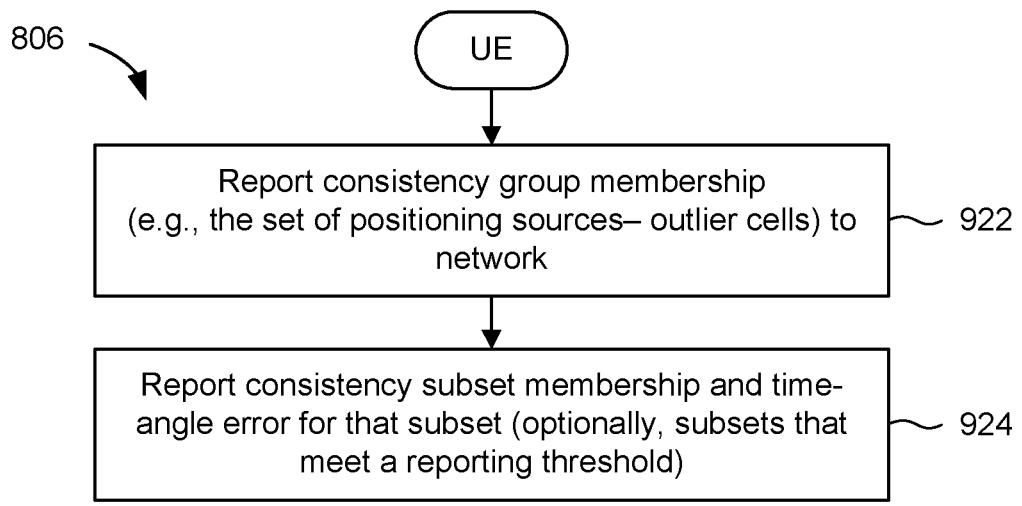

FIGS. 9A and 9B are flow charts illustrating portions of the outlier detection shown in FIG. 8 in more detail, according to some aspects of the disclosure.

In FIG. 9A, block 802, identifying positioning sources that form a consistency group, and block 804, identifying one or more subsets of positioning sources within the consistency group, comprise the following steps.

At 900, from set of positioning sources, choose a sampling subset of size K. (For brevity, a sampling subset may also be referred to herein simply as a subset.) In some aspects, the subset may be randomly selected from the set of positioning sources. In some aspects, the subset may be selected from a predefined list of subsets provided to the UE by the network.

At 902, estimate the UE position using values of one or more time-angle metrics from the positioning sources in sampling subset. In one example, the UE position is estimated using ToA values from the positioning sources in the sampling subset. In another example, the UE position is estimated using the combination of ToA and AoA values from the positioning sources in the sampling subset.

At 904, use the UE position to compute expected values of the one or more time-angle metrics values from cells in set of positioning sources but not in subset. In one example, the estimated UE position is used to compute expected values of ToA for the cells in set of positioning sources but not in subset. In another example, the estimated UE position is used to compute expected values of ToA and AoA for the cells in set of positioning sources but not in subset.

At 906, determine Li, the number of inliers in the set of positioning sources associated with the sampling subset, and the error of the inliers. For example, the error of the inliers may be a timing error, an angle error, or a combination thereof. In some aspects, the error of the inliers is the average error of the inliers, but may alternatively be the maximum time-angel metric error of the inliers, or may be calculated in some other manner.

At 908, the subset, number of inliers Li based on subset, and the error of those inliers is stored (e.g., in a random access memory (RAM) or flash memory within the UE) for later access. In some aspects, the list of inliers Ii determined using the sampling subset may also be stored.

The operations 900 through 908 comprises a sampling and consensus operation 910 using one subset of the positioning sources in set of positioning sources, and, at 912, it is determined whether additional sampling and consensus operations 910 should be performed. In FIG. 9A, a parameter M specifies how many sampling and consensus operations 910, and thus, how many subsets, must be processed. If the number of subsets that have been processed is less than M, the sampling and consensus operation 910 is repeated until M subsets have been processed. In some aspects, during each sampling and consensus operation 910, the values of the sampling subset, Li, and the error of the inliers are stored, e.g., $\{S_1, L_1, E_1\}$ through $\{S_M, L_M, E_M\}$ will have been stored by the time the process goes to 914.

At 914, a sampling subset that produced the largest number of inliers (i.e., Lx) is selected. At 916, non-inlier positioning sources are declared as outlier positioning sources. At 918, the consistency group is defined as the set of positioning sources excluding the outlier positioning sources. At 920, the UE position is computed using ToA values of positioning sources within the consistency group.

In FIG. 9B, block 806, reporting information about the consistency group and information about at least one of the one or more subsets of positioning sources within the consistency group to the network comprises, at 922, reporting the membership of the consistency group, and at 924, reporting the membership of at least one of the sampling subsets (and, optionally, Ii), and the error of the inliers associated with the sampling subset. In some aspects, the UE only reports those subsets having an error less than a reporting threshold $T_R$.

Figure 10:
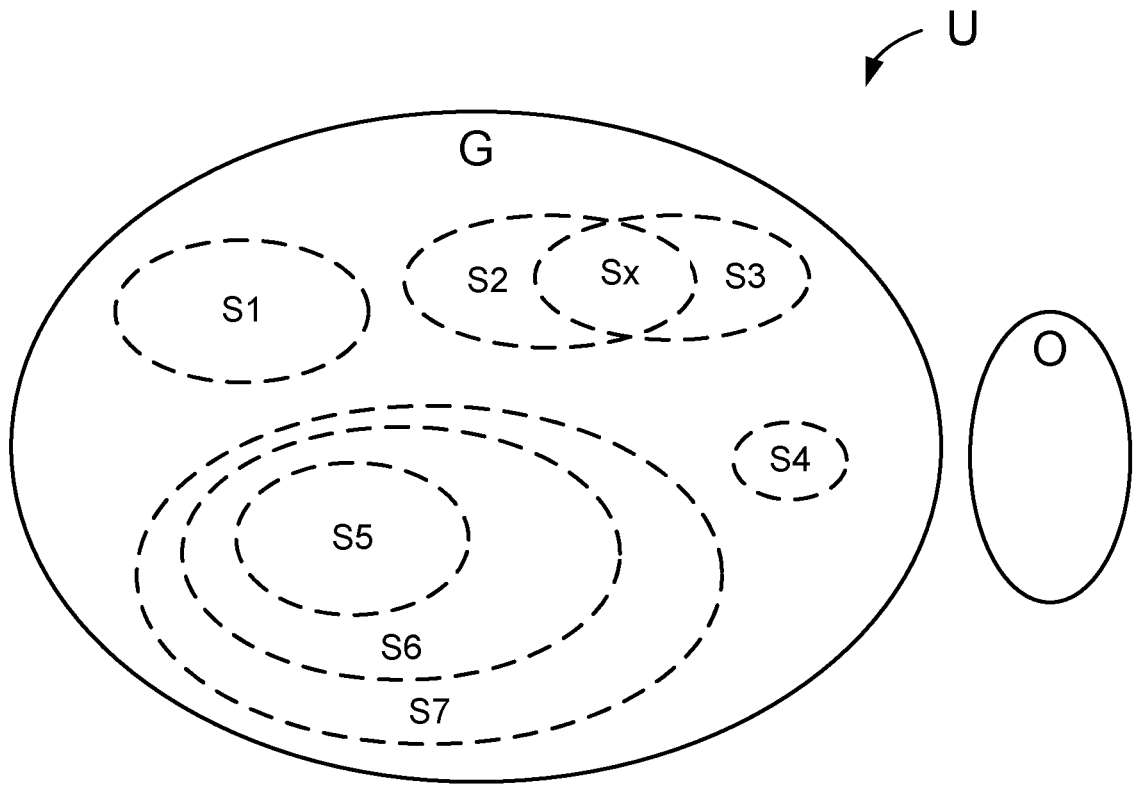
FIG. 10 illustrates an example result of methods of wireless communication according to some aspects of the disclosure.

FIG. 10 illustrates an example result of outlier detection 710, in which a set of positioning sources U is analyzed, resulting in a consistency group G and a set of outliers O. Within the consistency group, several subsets S1-S7 are identified.

In some aspects, the subsets may be the same size or may be different sizes. In FIG. 10, for example, S4 is a small subset and S7 is a big subset. In some aspects, a minimum number of subsets P may be configured as a reporting requirement. In some aspects, the value for P may depend upon the size of the set of positioning sources. In some aspects, the subsets may have to satisfy the same error threshold or different error thresholds. For example, in some aspects, all subsets may have to satisfy the error threshold but the maximum deviation from the error threshold is reported. In some aspects, the detailed consistency errors of each link in the consistency group or subset may be reported. In some aspects, for each link in the consistency group or subset, its error with respect to the consensus, rather than to the threshold, may be reported; this may provide some benefits to model the error distribution more accurately. In some aspects, multiple thresholds may be configured, with the requirement that at least Pi subsets must meet a particular threshold.

Random. In some aspects, the membership of the subsets is chosen randomly from the members of set of positioning sources. In these aspects, the subset report identifies the membership of each subset. In some aspects, the network may instruct or configure the UE with the number of random subsets to be tried.

Pseudorandom. In some aspects, the membership of the subsets is chosen pseudo-randomly, e.g., according to a pseudorandom sequence (PRS) known to both the UE and the network. In these aspects, the UE may report the subsets as initial values for the pseudorandom number generator (PNG), i.e., the PNG "seed", and offsets into the PRS generated, and various other parameters, e.g., to indicate the sizes of each subset, etc., with which the network can reconstruct the list of members of each subset. In some aspects, the network may provide the PNG seed value to the UE.

Predefined. In some aspects, the membership of the subsets is provided to the UE, e.g., by a location server. In some aspects, the UE can report which of these sets can be used to derive consistent measurements. In these aspects, the subset report may identify which of the predefined subsets are being reported by index, offset, key, field, or other identifier. In some aspects, the predefined subsets may be defined by an earlier UE report, by an RRC configuration from the base station or location server, or a combination thereof.

In some aspects, a subset of the consistency group may be reported using the same report format used to report the consistency group.

In some aspects, where the subsets are randomly generated, each subset may be explicitly (e.g., fully or completely) described in the report. In some aspects, a subset may be described as a list of the positioning sources Pi that are within the subset, e.g., the sampling subset $Si=\{P_1, P_3, P_9, P_{10}\}$, which themselves may be explicitly or implicitly identified or described (e.g., by index or reference). In some aspects, a subset may be described using a list of the positioning sources that are not within the subset, e.g., the sampling subset $Si=U-\{P_4, P_8\}$. In some aspects, where the subsets are selected from a predefined list of subsets of positioning sources within set of positioning sources, the subsets may be identified by name, position or index in the list, etc., which the location server can use to determine the positioning sources within that subset.

In some aspects, a list of subsets may be reported differentially. In some aspects, nested subsets may be reported in order of increasing size, where the membership of the smallest subset is fully specified, and for each of the larger subsets, only the additional members of the larger subset is reported.

Referring again to FIG. 10, in one example $S5=\{A,B,C\}$, $S6=\{A,B,C,D,E\}$, and $S7=\{A,B,C,D,E,F\}$. In this example, the report format could be:

(S5: {A,B,C}; S6:+{D,E}; S7:+{F})

In another example, where $S2=\{G,H,I,J,K,L\}$ and $S3=\{I,J,K,L,M,N\}$, the report format could identify the intersection of the two sets (indicated by operator "∩") and the membership of one set X that isn't in the other set Y (indicated by operator "X\Y"):

S2∩S3:{I,J,K,L}; S2\S3:{G,H}; S3\S2: {M,N} or a dummy subset Sx may be used, e.g.:

Sx:{I,J,K,L}; S1:Sx+{G,H}; S2:Sx+{M,N} for example. These examples are not limiting, and illustrate the point that the size of a subset report may be reduced by differential reporting, other data compression methods, or a combination thereof.

In some aspects, the report format may depend on whether the report is carried on L1 (e.g., in an uplink control information (UCI) message), on L2 (e.g., in a MAC-CE, or on L3 (e.g., via RRC, LPP, etc.). In some aspects, the report format may depend on subset constraints described above. For example, where the subsets are grouped by different thresholds, subsets within each threshold may be reported differentially as a group.

In some aspects, a subset may be reported only if it satisfies a reporting threshold. For example, in some embodiments, the subset may be reported if a timing error for that threshold satisfies a threshold reporting value Tr.

In some aspects, subsets to be reported may be subject to constraints that limit how much one subset may overlap with another subset, e.g., how many positioning sources can be common to both subsets. For example, reporting two subsets that differ by only one positioning source may be less useful than reporting two subsets that differ more substantially. In some aspects, two subsets differ substantially if the number of elements common to both subsets is less than a threshold number or threshold percentage of the number of elements in the subset. In some aspects, two subsets differ substantially if the number of elements not common to both subsets is greater than a threshold number of threshold percentage of the number of elements in the subset. In some aspects, the threshold number or threshold percentage may be the same for all subsets. In some aspects, the threshold number or threshold percentage may be different for different subsets, e.g., it may depend on the size of the subset. In some aspects, two subsets differ substantially if at least one of the subsets satisfies the criteria for non-overlap. In some aspects, two differ substantially only if both of the subsets satisfy the criteria for non-overlap. In FIG. 10, for example, the memberships of subsets S2 and S3 may not differ by a sufficient amount that both should be reported. In some aspects, one of the two sets (e.g., either S2 or S3) is reported. In some aspects, neither set is reported. In some aspects, such as where the relative timing errors of S2 and S3 are the same or sufficiently similar, a new set comprising the union of S2 and S3 may be reported.

Figure 11:
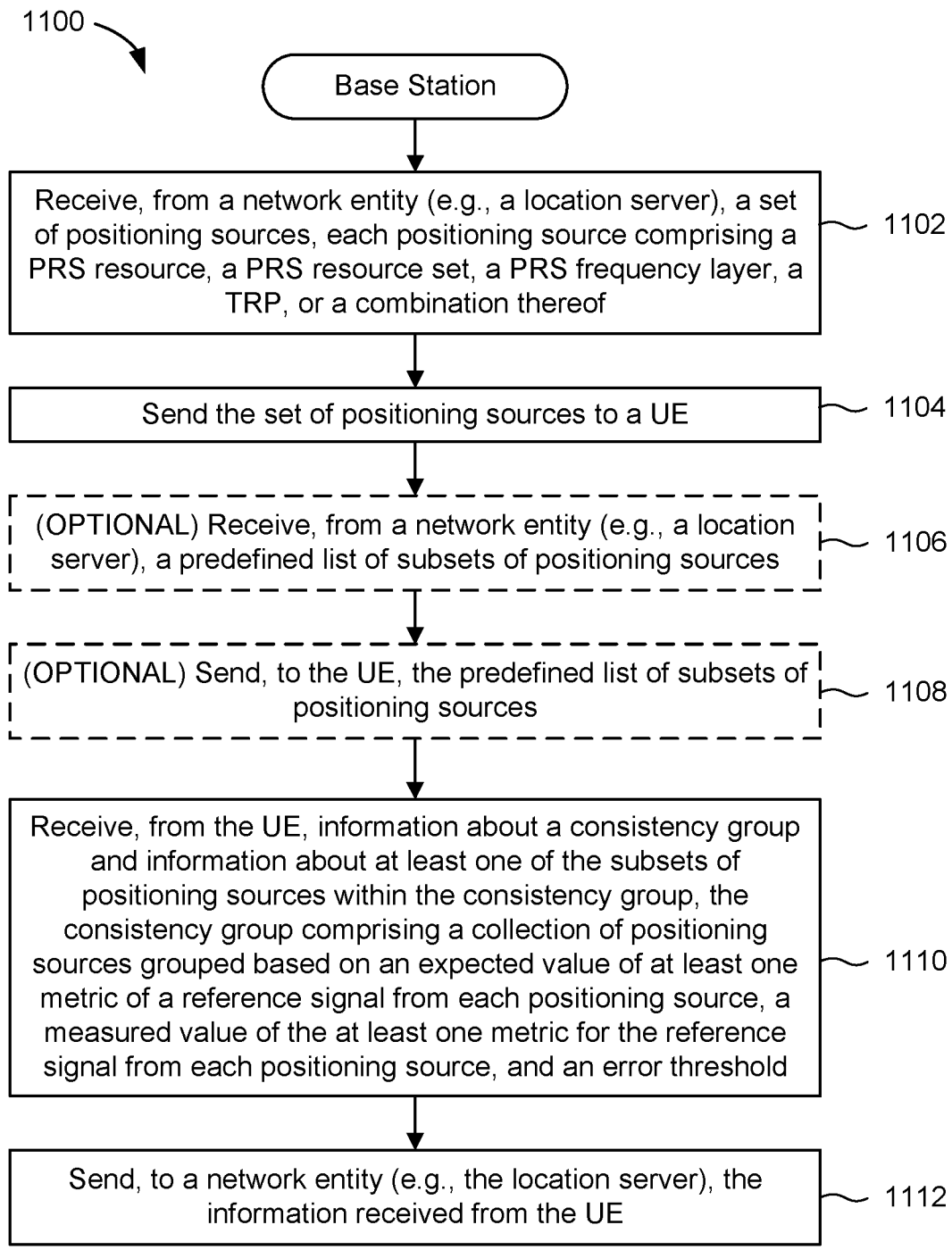
FIGS. 11 and 12 are flowcharts illustrating methods of wireless communication according to some aspects of the disclosure.

FIG. 11 is a flowchart of an example process 1100 associated with prioritization of positioning-related reports in uplink, according to aspects of the disclosure. In some implementations, one or more process blocks of FIG. 11 may be performed by a base station (BS) (e.g., BS 102) or a gNodeB (gNB). In some implementations, one or more process blocks of FIG. 11 may be performed by another device or a group of devices separate from or including the BS. Additionally, or alternatively, one or more process blocks of FIG. 11 may be performed by one or more components of BS 304, such as processor(s) 384, memory 386, WWAN transceiver(s) 350, short-range wireless transceiver(s) 360, satellite signal receiver 370, network transceiver(s) 380, and positioning component(s) 388, any or all of which may be means for performing the operations of process 1100.

As shown in FIG. 11, process 1100 may include receiving, from a network entity, a set of positioning sources, each positioning source comprising a positioning reference signal (PRS) resource, a PRS resource set, a PRS frequency layer, a transmission/reception point (TRP), or a combination thereof (block 1102). Means for performing the operation of block 1102 may include the processor(s) 384, memory 386, or WWAN transceiver(s) 350 of the BS 304. For example, the BS 304 may receive the set of positioning sources using the receiver(s) 352. In some aspects, the network entity may include a location server. In some aspects, the location server may include a location management function (LMF) or a secure user plane location (SUPL) location platform (SLP). In some aspects, the base station may include a gNodeB (gNB). In some aspects, the location server may be a component of, or co-located with, the base station.

As further shown in FIG. 11, process 1100 may include sending, to a user equipment (UE), the set of positioning sources (block 1104). Means for performing the operation of block 1104 may include the processor(s) 384, memory 386, or WWAN transceiver(s) 350 of the BS 304. For example, the BS 304 may send the set of positioning sources using the transmitter(s) 354. In some aspects, the set of positioning sources may be transmitted to the UE via RRC or LLP.

In some aspects, as further shown in FIG. 11, the base station may optionally receive, from the network entity, a predefined list of subsets of positioning sources within the set of positioning sources (optional block 1106) and may optionally send the predefined list of subsets of positioning sources to the UE (optional block 1108). Means for performing the operations of optional block 1106 and optional block 1108 may include the processor(s) 384, memory 386, or WWAN transceiver(s) 350 of the BS 304. For example, the BS 304 may receive the predefined list of subsets using the receiver(s) 352 and send them using the transmitter(s)

354. The positioning sources within a particular subset may be identified explicitly (e.g., by cell identifier, TRP identifier, etc.) or implicitly (e.g., by an index into a predefined list already known to the base station and UE. In some aspects, the positioning sources included in each subset are identified completely or differentially, explicitly or implicitly, by index or reference, or a combination thereof. In some aspects, the information about at least one of the subsets of positioning sources within the consistency group comprises an error for the at least one subset.

As further shown in FIG. 11, process 1100 may include receiving, from the UE, information about a consistency group and information about at least one subset of positioning sources within the consistency group, the consistency group comprising a collection of positioning sources grouped based on an expected value of at least one metric of a reference signal from each positioning source, a measured value of the at least one metric for the reference signal from each positioning source, and an error threshold (block 1110). Means for performing the operation of block 1110 may include the processor(s) 384, memory 386, or WWAN transceiver(s) 350 of the BS 304. For example, the BS 304 may receive the information about a consistency group and the information about at least one subset of positioning sources within the consistency group, using the receiver(s) 352. In some aspects, the information about at least one of the subsets of positioning sources within the consistency group includes information identifying the positioning sources included in each subset. In some aspects, the information about at least one of the subsets of positioning sources within the consistency group includes an error associated with each subset, an error for each positioning source included in the subset, the error for each positioning source with respect to the error threshold, the error with respect to a consensus value produced by the subset, or a combination thereof. In some aspects, the information about at least one of the subsets of positioning sources within the consistency group includes information on subsets having an error that satisfies a threshold reporting value Tr.

As further shown in FIG. 11, process 1100 may include sending, to the network entity, the information about the consistency group and the information about the at least one subset of positioning sources within the consistency group (block 1112). Means for performing the operation of block 1112 may include the processor(s) 384, memory 386, or WWAN transceiver(s) 350 of the BS 304. For example, the BS 304 may send the information about the consistency group and the information about the at least one subset of positioning sources within the consistency group, using the transmitter(s) 354. In some aspects, the information includes an average timing error for the subset. In some aspects, the at least one metric comprises a time of arrival (ToA), an angle of arrival (AoA), a zenith of arrival (ZoA), a time difference of arrival (TDoA), a time of departure (ToD), an angle of departure (AoD), a zenith of departure (ZoD), a reference signal time difference (RSTD), a reference signal received power (RSRP), a round-trip time (RTT), or a combination thereof. In some aspects, the error threshold comprises one or more time-angle thresholds. In some aspects, each member of the consistency group must satisfy at least one of the one or more time-angle thresholds. In some aspects, each member of the consistency group must satisfy all of the one or more time-angle thresholds.

Process 1100 may include additional implementations, such as any single implementation or any combination of implementations described below and/or in connection with one or more other processes described elsewhere herein.

Although FIG. 11 shows example blocks of process 1100, in some implementations, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
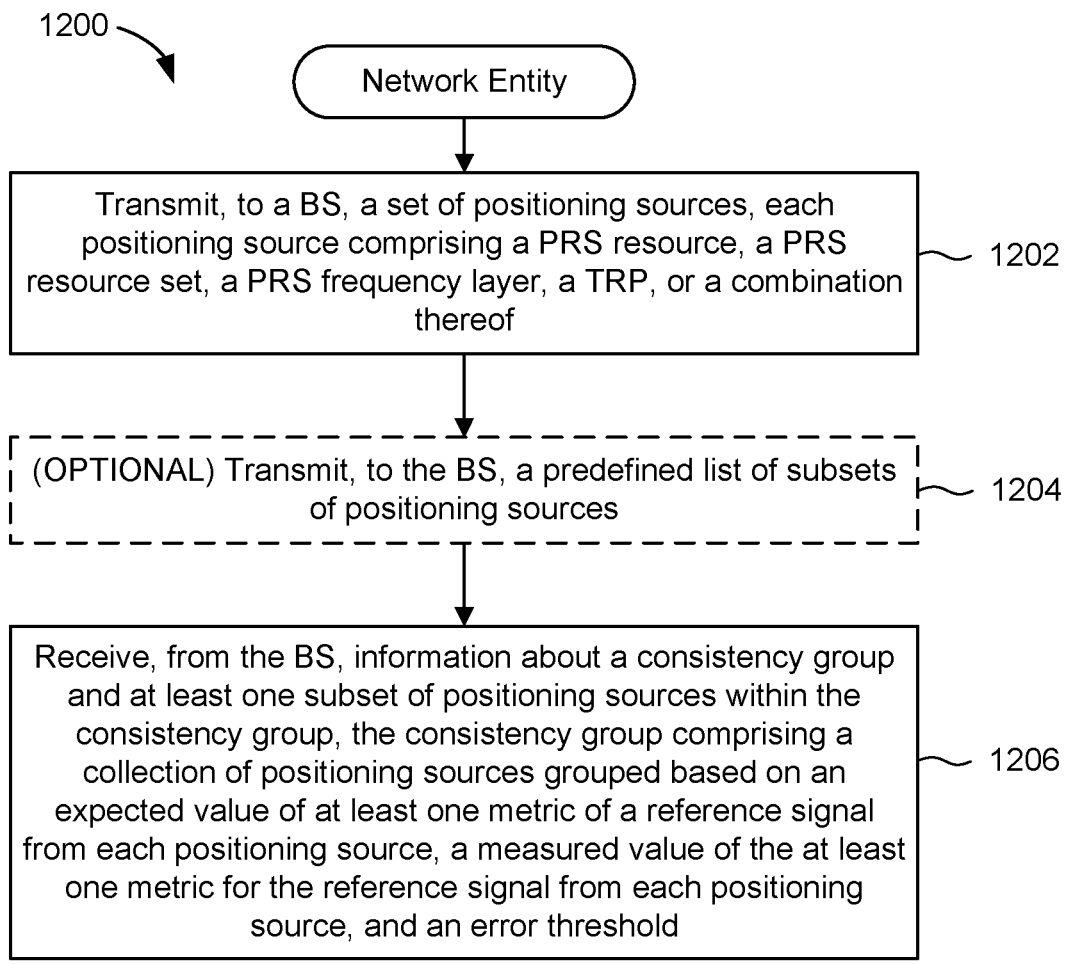

FIG. 12 is a flowchart of an example process 1200 associated with prioritization of positioning-related reports in uplink, according to aspects of the disclosure. In some implementations, one or more process blocks of FIG. 12 may be performed by a network entity (e.g., location server 172). In some implementations, one or more process blocks of FIG. 12 may be performed by another device or a group of devices separate from or including the network entity. Additionally, or alternatively, one or more process blocks of FIG. 12 may be performed by one or more components of network entity 306, such as processor(s) 394, memory 396, network transceiver(s) 390, and positioning component(s) 398, any or all of which may be means for performing the operations of process 1200.

As shown in FIG. 12, process 1200 may include sending, to a base station, a set of positioning sources, each positioning source comprising a positioning reference signal (PRS) resource, a PRS resource set, a PRS frequency layer, a transmission/reception point (TRP), or a combination thereof (block 1202). Means for performing the operation of block 1202 may include the processor(s) 394, memory 396, or network transceiver(s) 390 of the network entity 306. For example, the network entity 306 may send the set of positioning sources using the network transceiver(s) 390.

In some aspects, as further shown in FIG. 12, the network entity may optionally send a predefined list of subsets of positioning sources to the base station (block 1204). Means for performing the operation of optional block 1204 may include the processor(s) 394, memory 396, or network transceiver(s) 390 of the network entity 306. For example, the network entity 306 may send the predefined list of subsets of positioning sources using the network transceiver(s) 390.

As further shown in FIG. 12, process 1200 may include receiving, from the base station, information about a consistency group and information about at least one subset of positioning sources within the consistency group, the consistency group comprising a collection of positioning sources grouped based on an expected value of at least one metric of a reference signal from each positioning source, a measured value of the at least one metric for the reference signal from each positioning source, and an error threshold (block 1206). Means for performing the operation of block 1206 may include the processor(s) 394, memory 396, or network transceiver(s) 390 of the network entity 306. For example, the network entity 306 may receive the information about a consistency group and the information about at least one subset of positioning sources within the consistency group, using the network transceiver(s) 390. In some aspects, the at least one metric comprises a time of arrival (ToA), an angle of arrival (AoA), a zenith of arrival (ZoA), a time difference of arrival (TDoA), a time of departure (ToD), an angle of departure (AoD), a zenith of departure (ZoD), a reference signal time difference (RSTD), a reference signal received power (RSRP), a round-trip time (RTT), or a combination thereof. In some aspects, the error threshold comprises a time-angle threshold. In some aspects, the error threshold may include a time-angle threshold. In some aspects, the time-angle threshold may include a timing threshold, an angle threshold, a received power threshold, or a combination thereof. In some aspects, the error threshold may include multiple time-angle thresholds. In some aspects, each member of the consistency group must satisfy at least one of the multiple time-angle thresholds. In some aspects, each member of the consistency group must satisfy all of the multiple time-angle thresholds.

In some aspects, prior to receiving the information about the consistency group and information about at least one of the subsets of positioning sources within the consistency group, a predefined list of subsets of subsets of positioning sources within the consistency group is sent to the base station.

Process 1200 may include additional implementations, such as any single implementation or any combination of implementations described below and/or in connection with one or more other processes described elsewhere herein. Although FIG. 12 shows example blocks of process 1200, in some implementations, process 1200 may include additional blocks, fewer blocks, different blocks, or differently arranged blocks than those depicted in FIG. 12. Additionally, or alternatively, two or more of the blocks of process 1200 may be performed in parallel.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a user equipment (UE), comprising: identifying a set of positioning sources, each positioning source comprising a positioning reference signal (PRS) resource, a PRS resource set, a PRS frequency layer, a transmission/reception point (TRP), or a combination thereof; identifying, from the set of positioning sources, positioning sources that form a consistency group, the consistency group comprising a collection of positioning sources grouped based on an expected value of at least one metric of a reference signal from each positioning source, a measured value of the at least one metric for the reference signal from each positioning source, and an error threshold; identifying one or more subsets of positioning sources within the consistency group, each subset having at least one metric error value; and reporting, to a network entity, information about the consistency group and information about at least one of the subsets of positioning sources within the consistency group.

Clause 2. The method of clause 1, wherein the at least one metric comprises a time of arrival (ToA), an angle of arrival (AoA), a zenith of arrival (ZoA), a time difference of arrival (TDoA), a time of departure (ToD), an angle of departure (AoD), a zenith of departure (ZoD), a reference signal time difference (RSTD), a reference signal received power (RSRP), a round-trip time (RTT), or a combination thereof.

Clause 3. The method of any of clauses 1 to 2, wherein the error threshold comprises a time-angle threshold.

Clause 4. The method of any of clauses 1 to 3, wherein identifying the set of positioning sources comprises receiving the set of positioning sources from a base station.

Clause 5. The method of any of clauses 1 to 4, wherein identifying, from the set of positioning sources, positioning sources that form a consistency group, comprises: performing a sampling operation a number of times M>1, each sampling operation using a respective sampling subset of the set of positioning sources to identify, as inliers, positioning sources not in the sampling subset that have an error less than the error threshold; selecting a sampling subset according to a consensus metric; identifying, as outliers, positioning sources not in the selected sampling subset that do not have an error less than the error threshold; identifying, as the consistency group, the set of positioning sources excluding the outliers; and computing a UE position based on values of one or more time-angle metrics from positioning sources selected from a combination of the selected sampling subset and the inliers identified using the sampling subset that produced a largest number of inliers.

Clause 6. The method of clause 5, wherein performing the sampling operation comprises: selecting, from the set of positioning sources, a sampling subset; estimating, using values for the one or more time-angle metrics from the positioning sources in the sampling subset, a position of the UE; computing expected values for the one or more time-angle metrics from the estimated position of the UE to the positioning sources in set of positioning sources not in the sampling subset; determining a number of inliers associated with the sampling subset, the inliers comprising positioning sources in set of positioning sources not in the sampling subset that have an error less than the error threshold; and determining an error of the inliers.

Clause 7. The method of clause 6, wherein selecting the sampling subset from the set of positioning sources comprises selecting positioning sources within the set of positioning sources to comprise the sampling subset randomly, according to a pseudorandom sequence, or from a predefined list of subsets of positioning sources within the set of positioning sources.

Clause 8. The method of any of clauses 1 to 7, wherein reporting information about at least one of the subsets of positioning sources within the consistency group comprises identifying the positioning sources included in each subset.

Clause 9. The method of any of clauses 1 to 8, wherein reporting information about at least one of the subsets of positioning sources within the consistency group comprises reporting an error associated with each subset, reporting an error for each positioning source included in the subset, reporting the error for each positioning source with respect to the error threshold, reporting the error with respect to a consensus value produced by the subset, or a combination thereof.

Clause 10. The method of any of clauses 1 to 9, wherein reporting information about at least one of the subsets of positioning sources within the consistency group comprises reporting subsets having an error that satisfies a threshold reporting value.

Clause 11. A method of wireless communication performed by a base station, comprising: receiving, from a network entity, a set of positioning sources, each positioning source comprising a positioning reference signal (PRS) resource, a PRS resource set, a PRS frequency layer, a transmission/reception point (TRP), or a combination thereof; sending, to a user equipment (UE), the set of positioning sources; receiving, from the UE, information about a consistency group and information about at least one subset of positioning sources within the consistency group, the consistency group comprising a collection of positioning sources grouped based on an expected value of at least one metric of a reference signal from each positioning source, a measured value of the at least one metric for the reference signal from each positioning source, and an error threshold; and sending, to the network entity, the information about the consistency group and the information about the at least one subset of positioning sources within the consistency group.

Clause 12. The method of clause 11, wherein the at least one metric comprises a time of arrival (ToA), an angle of arrival (AoA), a zenith of arrival (ZoA), a time difference of arrival (TDoA), a time of departure (ToD), an angle of departure (AoD), a zenith of departure (ZoD), a reference signal time difference (RSTD), a reference signal received power (RSRP), a round-trip time (RTT), or a combination thereof.

Clause 13. The method of any of clauses 11 to 12, wherein the error threshold comprises one or more time-angle thresholds.

Clause 14. The method of clause 13, wherein each member of the consistency group must satisfy at least one of the one or more time-angle thresholds.

Clause 15. The method of any of clauses 13 to 14, wherein each member of the consistency group must satisfy all of the one or more time-angle thresholds.

Clause 16. The method of any of clauses 11 to 15, further comprising, prior to receiving information about a consistency group and information about at least one of the subsets of positioning sources within the consistency group from the UE: receiving, from the network entity, a predefined list of subsets of positioning sources within the set of positioning sources; and sending, to the UE, the predefined list of subsets of positioning sources within the set of positioning sources.

Clause 17. The method of any of clauses 11 to 16, wherein the information about at least one of the subsets of positioning sources within the consistency group comprises an error for the at least one subset.

Clause 18. The method of any of clauses 11 to 17, wherein receiving, from the UE, information about at least one of the subsets of positioning sources within the consistency group comprises receiving information identifying the positioning sources included in each subset.

Clause 19. The method of any of clauses 11 to 18, wherein receiving, from the UE, information about at least one of the subsets of positioning sources within the consistency group comprises receiving an error associated with each subset, receiving an error for each positioning source included in the subset, receiving the error for each positioning source with respect to the error threshold, receiving the error with respect to a consensus value produced by the subset, or a combination thereof.

Clause 20. The method of any of clauses 11 to 19, wherein receiving, from the UE, information about at least one of the subsets of positioning sources within the consistency group comprises receiving information on subsets having an error that satisfies a threshold reporting value Tr.

Clause 21. A method of wireless communication performed by a network entity, comprising: sending, to a base station, a set of positioning sources, each positioning source comprising a positioning reference signal (PRS) resource, a PRS resource set, a PRS frequency layer, a transmission/reception point (TRP), or a combination thereof; and receiving, from the base station, information about a consistency group and information about at least one subset of positioning sources within the consistency group, the consistency group comprising a collection of positioning sources grouped based on an expected value of at least one metric of a reference signal from each positioning source, a measured value of the at least one metric for the reference signal from each positioning source, and an error threshold.

Clause 22. The method of clause 21, wherein the at least one metric comprises a time of arrival (ToA), an angle of arrival (AoA), a zenith of arrival (ZoA), a time difference of arrival (TDoA), a time of departure (ToD), an angle of departure (AoD), a zenith of departure (ZoD), a reference signal time difference (RSTD), a reference signal received power (RSRP), a round-trip time (RTT), or a combination thereof.

Clause 23. The method of any of clauses 21 to 22, wherein the error threshold comprises a time-angle threshold.

Clause 24. The method of any of clauses 21 to 23, further comprising, prior to receiving the information about the consistency group and information about at least one of the subsets of positioning sources within the consistency group, sending, to the base station, a predefined list of subsets of subsets of positioning sources within the consistency group.

Clause 25. A user equipment (UE), comprising: a memory; at least one transceiver; and at least one processor communicatively coupled to the memory and the at least one transceiver, the at least one processor configured to: identify a set of positioning sources, each positioning source comprising a positioning reference signal (PRS) resource, a PRS resource set, a PRS frequency layer, a transmission/reception point (TRP), or a combination thereof; identify, from the set of positioning sources, positioning sources that form a consistency group, the consistency group comprising a collection of positioning sources group based on an expected value of at least one metric of a reference signal from each positioning source, a measured value of the at least one metric for the reference signal from each positioning source, and an error threshold; identify one or more subsets of positioning sources within the consistency group, each subset having at least one metric error value; and report, to a network entity, information about the consistency group and information about at least one of the subsets of positioning sources within the consistency group.

Clause 26. The UE of clause 25, wherein the at least one metric comprises a time of arrival (ToA), an angle of arrival (AoA), a zenith of arrival (ZoA), a time difference of arrival (TDoA), a time of departure (ToD), an angle of departure (AoD), a zenith of departure (ZoD), a reference signal time difference (RSTD), a reference signal received power (RSRP), a round-trip time (RTT), or a combination thereof.

Clause 27. The UE of any of clauses 25 to 26, wherein the error threshold comprises a time-angle threshold.

Clause 28. The UE of any of clauses 25 to 27, wherein, to identify the set of positioning sources, the at least one processor is configured to receive the set of positioning sources from a base station.

Clause 29. The UE of any of clauses 25 to 28, wherein, to identify, from the set of positioning sources, positioning sources that form a consistency group, the at least one processor is configured to: perform a sampling operation a number of times M>1, each sampling operation using a respective sampling subset of the set of positioning sources to identify, as inliers, positioning sources not in the sampling subset that have an error less than the error threshold; select a sampling subset according to a consensus metric; identify, as outliers, positioning sources not in the selected sampling subset that do not have an error less than the error threshold; identify, as the consistency group, the set of positioning sources excluding the outliers; and compute a UE position based on values of one or more time-angle metrics from positioning sources selected from a combination of the selected sampling subset and the inliers identified using the sampling subset that produced a largest number of inliers.

Clause 30. The UE of clause 29, wherein, to perform the sampling operation, the at least one processor is configured to: select, from the set of positioning sources, a sampling subset; estimate, using time-angle metric values from the positioning sources in the sampling subset, a position of the UE; compute an expected time-angle metric value from the estimated position of the UE to the positioning sources in set of positioning sources not in the sampling subset; determine a number of inliers associated with the sampling subset, the inliers comprising positioning sources in set of positioning sources not in the sampling subset that have an error less than the error threshold; and determine an error of the inliers.

Clause 31. The UE of clause 30, wherein, to select the sampling subset from the set of positioning sources, the at least one processor is configured to select positioning sources within the set of positioning sources to comprise the sampling subset randomly, according to a pseudorandom sequence, or from a predefined list of subsets of positioning sources within the set of positioning sources.

Clause 32. The UE of any of clauses 25 to 31, wherein, to report information about at least one of the subsets of positioning sources within the consistency group, the at least one processor is configured to identify the positioning sources included in each subset.

Clause 33. The UE of any of clauses 25 to 32, wherein, to report information about at least one of the subsets of positioning sources within the consistency group, the at least one processor is configured to report an error associated with each subset, reporting an error for each positioning source included in the subset, reporting the error for each positioning source with respect to the error threshold, reporting the error with respect to a consensus value produced by the subset, or a combination thereof.

Clause 34. The UE of any of clauses 25 to 33, wherein, to report information about at least one of the subsets of positioning sources within the consistency group, the at least one processor is configured to report subsets having an error that satisfies a threshold reporting value.

Clause 35. A base station (BS), comprising: a memory; at least one transceiver; and at least one processor communicatively coupled to the memory and the at least one transceiver, the at least one processor configured to: receive, via the at least one transceiver, from a network entity, a set of positioning sources, each positioning source comprising a positioning reference signal (PRS) resource, a PRS resource set, a PRS frequency layer, a transmission/reception point (TRP), or a combination thereof; send, via the at least one transceiver, to a user equipment (UE), the set of positioning sources; receive, via the at least one transceiver, from the UE, information about a consistency group and information about at least one subset of positioning sources within the consistency group, the consistency group comprising a collection of positioning sources grouped based on an expected value of at least one metric of a reference signal from each positioning source, a measured value of the at least one metric for the reference signal from each positioning source, and an error threshold; and send, via the at least one transceiver, to the network entity, the information about the consistency group and the information about the at least one subset of positioning sources within the consistency group.

Clause 36. The BS of clause 35, wherein the at least one metric comprises a time of arrival (ToA), an angle of arrival (AoA), a zenith of arrival (ZoA), a time difference of arrival (TDoA), a time of departure (ToD), an angle of departure (AoD), a zenith of departure (ZoD), a reference signal time difference (RSTD), a reference signal received power (RSRP), a round-trip time (RTT), or a combination thereof.

Clause 37. The BS of any of clauses 35 to 36, wherein the error threshold comprises one or more time-angle thresholds.

Clause 38. The BS of clause 37, wherein each member of the consistency group must satisfy at least one of the one or more time-angle thresholds.

Clause 39. The BS of any of clauses 37 to 38, wherein each member of the consistency group must satisfy all of the one or more time-angle thresholds.

Clause 40. The BS of any of clauses 35 to 39, wherein the at least one processor is further configured to, prior to receiving information about a consistency group and information about at least one of the subsets of positioning sources within the consistency group from the UE: receive, via the at least one transceiver, from the network entity, a predefined list of subsets of positioning sources within the set of positioning sources; and send, via the at least one transceiver, to the UE, the predefined list of subsets of positioning sources within the set of positioning sources.

Clause 41. The BS of any of clauses 35 to 40, wherein the information about at least one of the subsets of positioning sources within the consistency group comprises an error for the at least one subset.

Clause 42. The BS of any of clauses 35 to 41, wherein, to receive, from the UE, information about at least one of the subsets of positioning sources within the consistency group, the at least one processor is configured to receive information identifying the positioning sources included in each subset.

Clause 43. The BS of any of clauses 35 to 42, wherein, to receive, from the UE, information about at least one of the subsets of positioning sources within the consistency group, the at least one processor is configured to receive an error associated with each subset, receiving an error for each positioning source included in the subset, receiving the error for each positioning source with respect to the error threshold, receiving the error with respect to a consensus value produced by the subset, or a combination thereof.

Clause 44. The BS of any of clauses 35 to 43, wherein, to receive, from the UE, information about at least one of the subsets of positioning sources within the consistency group, the at least one processor is configured to receive information on subsets having an error that satisfies a threshold reporting value Tr.

Clause 45. A network entity, comprising: a memory; at least one transceiver; and at least one processor communicatively coupled to the memory and the at least one transceiver, the at least one processor configured to: send, via the at least one transceiver, to a base station, a set of positioning sources, each positioning source comprising a positioning reference signal (PRS) resource, a PRS resource set, a PRS frequency layer, a transmission/reception point (TRP), or a combination thereof; and receive, via the at least one transceiver, from the base station, information about a consistency group and information about at least one subset of positioning sources within the consistency group, the consistency group comprising a collection of positioning sources grouped based on an expected value of at least one metric of a reference signal from each positioning source, a measured value of the at least one metric for the reference signal from each positioning source, and an error threshold.

Clause 46. The network entity of clause 45, wherein the at least one metric comprises a time of arrival (ToA), an angle of arrival (AoA), a zenith of arrival (ZoA), a time difference of arrival (TDoA), a time of departure (ToD), an angle of departure (AoD), a zenith of departure (ZoD), a reference signal time difference (RSTD), a reference signal received power (RSRP), a round-trip time (RTT), or a combination thereof.

Clause 47. The network entity of any of clauses 45 to 46, wherein the error threshold comprises a time-angle threshold.

Clause 48. The network entity of any of clauses 45 to 47, wherein the at least one processor is further configured to, prior to receiving the information about the consistency group and information about at least one of the subsets of positioning sources within the consistency group, sending, to the base station, a predefined list of subsets of subsets of positioning sources within the consistency group.

Clause 49. A user equipment (UE), comprising: means for identifying a set of positioning sources, each positioning source comprising a positioning reference signal (PRS) resource, a PRS resource set, a PRS frequency layer, a transmission/reception point (TRP), or a combination thereof; means for identifying, from the set of positioning sources, positioning sources that form a consistency group, the consistency group comprising a collection of positioning sources means for grouping based on an expected value of at least one metric of a reference signal from each positioning source, a measured value of the at least one metric for the reference signal from each positioning source, and an error threshold; means for identifying one or more subsets of positioning sources within the consistency group, each subset having at least one metric error value; and means for reporting, to a network entity, information about the consistency group and information about at least one of the subsets of positioning sources within the consistency group.

Clause 50. A base station (BS), comprising: means for receiving, from a network entity, a set of positioning sources, each positioning source comprising a positioning reference signal (PRS) resource, a PRS resource set, a PRS frequency layer, a transmission/reception point (TRP), or a combination thereof; means for sending, to a user equipment (UE), the set of positioning sources; means for receiving, from the UE, information about a consistency group and information about at least one subset of positioning sources within the consistency group, the consistency group comprising a collection of positioning sources grouped based on an expected value of at least one metric of a reference signal from each positioning source, a measured value of the at least one metric for the reference signal from each positioning source, and an error threshold; and means for sending, to the network entity, the information about the consistency group and the information about the at least one subset of positioning sources within the consistency group.

Clause 51. A network entity, comprising: means for sending, to a base station, a set of positioning sources, each positioning source comprising a positioning reference signal (PRS) resource, a PRS resource set, a PRS frequency layer, a transmission/reception point (TRP), or a combination thereof; and means for receiving, from the base station, information about a consistency group and information about at least one subset of positioning sources within the consistency group, the consistency group comprising a collection of positioning sources grouped based on an expected value of at least one metric of a reference signal from each positioning source, a measured value of the at least one metric for the reference signal from each positioning source, and an error threshold.

Clause 52. A non-transitory computer-readable medium storing computer-executable instructions that, when executed by a user equipment (UE), cause the UE to: identify a set of positioning sources, each positioning source comprising a positioning reference signal (PRS) resource, a PRS resource set, a PRS frequency layer, a transmission/reception point (TRP), or a combination thereof; identify, from the set of positioning sources, positioning sources that form a consistency group, the consistency group comprising a collection of positioning sources group based on an expected value of at least one metric of a reference signal from each positioning source, a measured value of the at least one metric for the reference signal from each positioning source, and an error threshold; identify one or more subsets of positioning sources within the consistency group, each subset having at least one metric error value; and report, to a network entity, information about the consistency group and information about at least one of the subsets of positioning sources within the consistency group.

Clause 53. A non-transitory computer-readable medium storing computer-executable instructions that, when executed by a base station (BS), cause the BS to: receive, from a network entity, a set of positioning sources, each positioning source comprising a positioning reference signal (PRS) resource, a PRS resource set, a PRS frequency layer, a transmission/reception point (TRP), or a combination thereof; send, to a user equipment (UE), the set of positioning sources; receive, from the UE, information about a consistency group and information about at least one subset of positioning sources within the consistency group, the consistency group comprising a collection of positioning sources grouped based on an expected value of at least one metric of a reference signal from each positioning source, a measured value of the at least one metric for the reference signal from each positioning source, and an error threshold; and send, to the network entity, the information about the consistency group and the information about the at least one subset of positioning sources within the consistency group.

Clause 54. A non-transitory computer-readable medium storing computer-executable instructions that, when executed by a network entity, cause the network entity to: send, to a base station, a set of positioning sources, each positioning source comprising a positioning reference signal (PRS) resource, a PRS resource set, a PRS frequency layer, a transmission/reception point (TRP), or a combination thereof; and receive, from the base station, information about a consistency group and information about at least one subset of positioning sources within the consistency group, the consistency group comprising a collection of positioning sources grouped based on an expected value of at least one metric of a reference signal from each positioning source, a measured value of the at least one metric for the reference signal from each positioning source, and an error threshold.

Clause 49. An apparatus comprising a memory, a transceiver, and a processor communicatively coupled to the memory and the transceiver, the memory, the transceiver, and the processor configured to perform a method according to any of clauses 1 to 24.

Clause 50. An apparatus comprising means for performing a method according to any of clauses 1 to 24.

Clause 51. A non-transitory computer-readable medium storing computer-executable instructions, the computer-executable comprising at least one instruction for causing a computer or processor to perform a method according to any of clauses 1 to 24.

Additional may aspects include, but are not limited to, the following:

In an aspect, a method of wireless communication performed by a user equipment (UE) includes identifying a set of positioning sources, each positioning source comprising a positioning reference signal (PRS) resource, a PRS resource set, a PRS frequency layer, a transmission/reception point (TRP), or combinations thereof identifying, from the set of positioning sources, positioning sources that form a consistency group, the consistency group comprising a collection of positioning sources grouped based on an estimated metric of a reference signal of the positioning source, the measured metric for the positioning source, and an error threshold; identifying one or more subsets of positioning sources within the consistency group, each subset having an error value; and reporting, to a network entity, information about the consistency group and information about at least one of the subsets of positioning sources within the consistency group.

In some aspects, the time-angle metric comprises a time of arrival (ToA), an angle of arrival (AoA), a zenith of arrival (ZoA), a time difference of arrival (TDoA), a time of departure (ToD), an angle of departure (AoD), a zenith of departure (ZoD), a reference signal time difference (RSTD), a reference signal received power (RSRP), a round-trip time (RTT), or combinations thereof.

In some aspects, the error threshold comprises a time-angle threshold.

In some aspects, the time-angle threshold comprises a timing threshold, an angle threshold, a received power threshold, or combinations thereof.

In some aspects, the error threshold comprises a plurality of time-angle thresholds.

In some aspects, each member of the consistency group must satisfy at least one of the plurality of time-angle thresholds.

In some aspects, each member of the consistency group must satisfy all of the plurality of time-angle thresholds.

In some aspects, identifying the set of positioning sources comprises receiving the set of positioning sources from a base station.

In some aspects, identifying, from the set of positioning sources, positioning sources that form a consistency group, comprises: performing a sampling and consensus operation a number of times M>1, each sampling and consensus operation using a different sampling subset of the positioning sources to identify, as inliers, positioning sources not in the sampling subset that have an error less than the threshold error; selecting a sampling subset that produced a largest number of inliers; identifying, as outliers, positioning sources not in the sampling subset that produced the largest number of inliers that do not have an error less than the threshold error; identifying, as the consistency group, the set of positioning sources excluding the outliers; and computing a UE position based on values of one or more time-angle metrics from positioning sources selected from a combination of the sampling subset that produced the largest number of inliers and the inliers identified using the sampling subset that produced the largest number of inliers.

In some aspects, performing the sampling and consensus operation comprises: selecting, from the set of positioning sources, a sampling subset; estimating, using time-angle metric values from the positioning sources in the sampling subset, a position of the UE; computing an expected time-angle metric value from the estimated position of the UE to the positioning sources in set of positioning sources not in the sampling subset; determining a number of inliers associated with the sampling subset, the inliers comprising positioning sources in set of positioning sources not in the sampling subset that have an error less than the threshold error; and determining, an average error of the inliers.

In some aspects, selecting the sampling subset from the set of positioning sources comprises selecting positioning sources within the set of positioning sources to comprise the sampling subset randomly.

In some aspects, selecting the sampling subset from the set of positioning sources comprises selecting positioning sources within the set of positioning sources to comprise the sampling subset according to a pseudorandom sequence.

In some aspects, selecting the sampling subset from the set of positioning sources comprises selecting a subset from a predefined list of subsets of positioning sources within the set of positioning sources.

In some aspects, every sampling subset is a same size.

In some aspects, at least one sampling subset is a different size from another sampling sub set.

In some aspects, the method includes storing the sampling subset, the number of inliers associated with the sampling subset, and the average error of the inliers.

In some aspects, reporting information about at least one of the subsets of positioning sources within the consistency group comprises identifying the positioning sources included in each subset.

In some aspects, the positioning sources included in each subset are identified completely or differentially, explicitly or implicitly, by index or reference, or combinations thereof.

In some aspects, reporting information about at least one of the subsets of positioning sources within the consistency group comprises reporting an error associated with each sub set.

In some aspects, reporting information about at least one of the subsets of positioning sources within the consistency group comprises reporting an error for each positioning source included in the subset.

In some aspects, reporting an error for each positioning source included in the subset comprises reporting the error for each positioning source with respect to the error threshold, with respect to a consensus value produced by the subset, or combinations thereof.

In some aspects, reporting information about at least one of the subsets of positioning sources within the consistency group comprises reporting subsets having an error that satisfies a threshold reporting value.

In an aspect, a method of wireless communication performed by a base station includes receiving, from a network entity, a set of positioning sources, each positioning source comprising a positioning reference signal (PRS) resource, a PRS resource set, a PRS frequency layer, a transmission/reception point (TRP), or combinations thereof; sending, to a user equipment (UE), the set of positioning sources; receiving, from the UE, information about a consistency group and information about at least one subset of positioning sources within the consistency group, the consistency group comprising a collection of positioning sources grouped based on an estimated metric of a reference signal of the positioning source, the measured metric for the positioning source, and an error threshold; and sending, to the network entity, the information about the consistency group and the information about the at least one subset of positioning sources within the consistency group.

In some aspects, the time-angle metric comprises a time of arrival (ToA), an angle of arrival (AoA), a zenith of arrival (ZoA), a time difference of arrival (TDoA), a time of departure (ToD), an angle of departure (AoD), a zenith of departure (ZoD), a reference signal time difference (RSTD), a reference signal received power (RSRP), a round-trip time (RTT), or a combination thereof.

In some aspects, the error threshold comprises a time-angle threshold.

In some aspects, the time-angle threshold comprises a timing threshold, an angle threshold, a received power threshold, or a combination thereof.

In some aspects, the error threshold comprises a plurality of time-angle thresholds.

In some aspects, each member of the consistency group must satisfy at least one of the plurality of time-angle thresholds.

In some aspects, each member of the consistency group must satisfy all of the plurality of time-angle thresholds.

In some aspects, the method includes receiving, from the network entity, a predefined list of subsets of positioning sources within the set of positioning sources; and sending, to the UE, the predefined list of subsets.

In some aspects, the network entity comprises a location server.

In some aspects, the location server comprises a location management function (LMF) or a secure user plane location (SUPL) location platform (SLP).

In some aspects, the base station comprises a gNodeB (gNB).

In some aspects, the information about at least one of the subsets of positioning sources within the consistency group comprises an average error for the at least one subset.

In some aspects, receiving, from the UE, information about at least one of the subsets of positioning sources within the consistency group comprises receiving information identifying the positioning sources included in each subset.

In some aspects, the positioning sources included in each subset are identified completely or differentially, explicitly or implicitly, by index or reference, or combinations thereof.

In some aspects, receiving, from the UE, information about at least one of the subsets of positioning sources within the consistency group comprises receiving an error associated with each subset.

In some aspects, receiving, from the UE, information about at least one of the subsets of positioning sources within the consistency group comprises receiving information identifying an error for each positioning source included in the subset.

In some aspects, receiving, from the UE, information about at least one of the subsets of positioning sources within the consistency group comprises receiving information identifying the error for each positioning source with respect to the error threshold, with respect to a consensus value produced by the subset, or combinations thereof.

In some aspects, receiving, from the UE, information about at least one of the subsets of positioning sources within the consistency group comprises receiving information on subsets having an error that satisfies a threshold reporting value Tr.

In an aspect, a method of wireless communication performed by a network entity includes sending, to a base station, a set of positioning sources, each positioning source comprising a positioning reference signal (PRS) resource, a PRS resource set, a PRS frequency layer, a transmission/reception point (TRP), or combinations thereof; and receiving, from the base station, information about a consistency group and information about at least one subset of positioning sources within the consistency group, the consistency group comprising a collection of positioning sources grouped based on an estimated metric of a reference signal of the positioning source, the measured metric for the positioning source, and an error threshold.

In some aspects, the time-angle metric comprises a time of arrival (ToA), an angle of arrival (AoA), a zenith of arrival (ZoA), a time difference of arrival (TDoA), a time of departure (ToD), an angle of departure (AoD), a zenith of departure (ZoD), a reference signal time difference (RSTD), a reference signal received power (RSRP), a round-trip time (RTT), or a combination thereof.

In some aspects, the error threshold comprises a time-angle threshold.

In some aspects, the time-angle threshold comprises a timing threshold, an angle threshold, a received power threshold, or combinations thereof.

In some aspects, the error threshold comprises a plurality of time-angle thresholds.

In some aspects, each member of the consistency group must satisfy at least one of the plurality of time-angle thresholds.

In some aspects, each member of the consistency group must satisfy all of the plurality of time-angle thresholds.

In some aspects, the method further comprises, prior to receiving the information about the consistency group and information about at least one of the subsets of positioning sources within the consistency group, sending, to the base station, a predefined list of subsets of subsets of positioning sources within the consistency group.

In some aspects, the network entity comprises a location server.

In some aspects, the location server comprises a location management function (LMF) or a secure user plane location (SUPL) location platform (SLP).

In an aspect, a user equipment (UE) includes a memory; at least one transceiver; and at least one processor communicatively coupled to the memory and the at least one transceiver, the at least one processor configured to: identify a set of positioning sources, each positioning source comprising a positioning reference signal (PRS) resource, a PRS resource set, a PRS frequency layer, a transmission/reception point (TRP), or combinations thereof; identify, from the set of positioning sources, positioning sources that form a consistency group, the consistency group comprising a collection of positioning sources grouped based on an estimated metric of a reference signal of the positioning source, the measured metric for the positioning source, and an error threshold; identify one or more subsets of positioning sources within the consistency group, each subset having an error value; and report, to a network entity, information about the consistency group and information about at least one of the subsets.

In some aspects, the time-angle metric comprises a time of arrival (ToA), an angle of arrival (AoA), a zenith of arrival (ZoA), a time difference of arrival (TDoA), a time of departure (ToD), an angle of departure (AoD), a zenith of departure (ZoD), a reference signal time difference (RSTD), a reference signal received power (RSRP), a round-trip time (RTT), or a combination thereof.

In some aspects, the error threshold comprises a time-angle threshold.

In some aspects, the time-angle threshold comprises a timing threshold, an angle threshold, a received power threshold, or a combination thereof.

In some aspects, the error threshold comprises a plurality of time-angle thresholds.

In some aspects, each member of the consistency group must satisfy at least one of the plurality of time-angle thresholds.

In some aspects, each member of the consistency group must satisfy all of the plurality of time-angle thresholds.

In some aspects, identifying the set of positioning sources comprises receiving the set of positioning sources from a base station.

In some aspects, identifying, from the set of positioning sources, positioning sources that form a consistency group, comprises: performing a sampling and consensus operation a number of times M>1, each sampling and consensus operation using a different sampling subset of the positioning sources in the set of positioning sources to identify, as inliers, positioning sources not in the sampling subset that have an error less than the error threshold; selecting a sampling subset that produced a largest number of inliers; identifying, as outliers, positioning sources not in the sampling subset that produced the largest number of inliers not having an error less than the error threshold; identifying, as the consistency group, set of positioning sources excluding the outliers; and computing a UE position based on values of one or more time-angle metrics from positioning sources selected from a combination of the sampling subset that produced the largest number of inliers and the inliers identified using the sampling subset that produced the largest number of inliers.

In some aspects, performing the sampling and consensus operation comprises: selecting, from the set of positioning sources, a sampling subset; estimating, using time-angle metric values from the positioning sources in the sampling subset, a position of the UE; computing an expected time-angle metric value from the estimated position of the UE to the positioning sources not in set of positioning sources not in the sampling subset; determining Li, the number of inliers associated with the sampling subset, the inliers comprising positioning sources in set of positioning sources not in sampling subset that have an error less than the error threshold; and determining a timing error of the inliers.

In some aspects, selecting, from the set of positioning sources, a sampling subset comprises randomly selecting positioning sources within set of positioning sources to comprise the sampling subset.

In some aspects, selecting, from the set of positioning sources, a sampling subset comprises selecting positioning sources within set of positioning sources to comprise the sampling subset according to a pseudorandom sequence.

In some aspects, selecting, from the set of positioning sources, a sampling subset comprises selecting the sampling subset from a predefined list of subsets of positioning sources within set of positioning sources.

In some aspects, every sampling subset is a same size.

In some aspects, at least one sampling subset is a different size from another sampling sub set.

In some aspects, the at least one processor is configured to store the sampling subset, Li, and the timing error of the inliers.

In some aspects, reporting information about at least one of the subsets comprises identifying the positioning sources included in each subset.

In some aspects, the positioning sources included in each subset are identified completely or differentially, explicitly or implicitly, by index or reference, or combinations thereof.

In some aspects, reporting information about the at least one of the subsets comprises reporting an error associated with each subset.

In some aspects, reporting information about at least one of the subsets comprises reporting an error for each positioning source included in the subset.

In some aspects, reporting an error for each positioning source included in the subset comprises reporting the error for each positioning source with respect to the error threshold, with respect to a consensus value produced by the subset, or combinations thereof.

In some aspects, reporting information about at least one of the subsets comprises reporting subsets having an error that satisfies a threshold reporting value Tr.

In an aspect, a base station includes a memory; at least one transceiver; and at least one processor communicatively coupled to the memory and the at least one transceiver, the at least one processor configured to: receive, from a network entity, a set of positioning sources, each positioning source comprising a positioning reference signal (PRS) resource, a PRS resource set, a PRS frequency layer, a transmission/reception point (TRP), or combinations thereof; cause the at least one transceiver to send, to a user equipment (UE), the set of positioning sources; receive, from the UE, information about a consistency group and information about at least one subset of positioning sources within the consistency group, the consistency group comprising a collection of positioning sources grouped based on an estimated metric of a reference signal of the positioning source, the measured metric for the positioning source, and an error threshold; and cause the at least one transceiver to send, to the network entity, the information about the consistency group and the information about the at least one subset of positioning sources within the consistency group.

In some aspects, the time-angle metric comprises a time of arrival (ToA), an angle of arrival (AoA), a zenith of arrival (ZoA), a time difference of arrival (TDoA), a time of departure (ToD), an angle of departure (AoD), a zenith of departure (ZoD), a reference signal time difference (RSTD), a reference signal received power (RSRP), a round-trip time (RTT), or a combination thereof.

In some aspects, the error threshold comprises a time-angle threshold.

In some aspects, the time-angle threshold comprises a timing threshold, an angle threshold, a received power threshold, or a combination thereof.

In some aspects, the error threshold comprises a plurality of time-angle thresholds.

In some aspects, each member of the consistency group must satisfy at least one of the plurality of time-angle thresholds.

In some aspects, each member of the consistency group must satisfy all of the plurality of time-angle thresholds.

In some aspects, the at least one processor is further configured to, prior to receiving information about a consistency group and information about at least one of the subsets of positioning sources within the consistency group from the UE: receive, from the network entity, a predefined list of subsets of positioning sources within the set of positioning sources; and cause the at least one transceiver to send, to the UE, the predefined list of subsets.

In some aspects, the network entity comprises a location server.

In some aspects, the location server comprises a location management function (LMF) or a secure user plane location (SUPL) location platform (SLP).

In some aspects, the base station comprises a gNodeB (gNB).

In some aspects, the information about at least one of the subsets of positioning sources within the consistency group comprises an average error for the at least one subset.

In some aspects, receiving, from the UE, information about at least one of the subsets of positioning sources within the consistency group comprises receiving information identifying the positioning sources included in each subset.

In some aspects, the positioning sources included in each subset are identified completely or differentially, explicitly or implicitly, by index or reference, or combinations thereof.

In some aspects, receiving, from the UE, information about at least one of the subsets of positioning sources within the consistency group comprises receiving an error associated with each subset.

In some aspects, receiving, from the UE, information about at least one of the subsets of positioning sources within the consistency group comprises receiving information identifying an error for each positioning source included in the subset.

In some aspects, receiving, from the UE, information about at least one of the subsets of positioning sources within the consistency group comprises receiving information identifying the error for each positioning source with respect to the error threshold, with respect to a consensus value produced by the subset, or combinations thereof.

In some aspects, receiving, from the UE, information about at least one of the subsets of positioning sources within the consistency group comprises receiving information on subsets having an error that satisfies a threshold reporting value Tr.

In an aspect, a network entity includes a memory; at least one network interface; and at least one processor communicatively coupled to the memory and the at least one network interface, the at least one processor configured to: cause the at least one network interface to send, to a base station, a set of positioning sources, each positioning source comprising a positioning reference signal (PRS) resource, a PRS resource set, a PRS frequency layer, a transmission/reception point (TRP), or combinations thereof; and receive, from the base station, information about a consistency group and information about at least one subset of positioning sources within the consistency group, the consistency group comprising a collection of positioning sources grouped based on an estimated metric of a reference signal of the positioning source, the measured metric for the positioning source, and an error threshold.

In some aspects, the time-angle metric comprises a time of arrival (ToA), an angle of arrival (AoA), a zenith of arrival (ZoA), a time difference of arrival (TDoA), a time of departure (ToD), an angle of departure (AoD), a zenith of departure (ZoD), a reference signal time difference (RSTD), a reference signal received power (RSRP), a round-trip time (RTT), or a combination thereof.

In some aspects, the error threshold comprises a time-angle threshold.

In some aspects, the time-angle threshold comprises a timing threshold, an angle threshold, a received power threshold, or a combination thereof.

In some aspects, the error threshold comprises a plurality of time-angle thresholds.

In some aspects, each member of the consistency group must satisfy at least one of the plurality of time-angle thresholds.

In some aspects, each member of the consistency group must satisfy all of the plurality of time-angle thresholds.

In some aspects, the at least one processor is further configured to, prior to receiving the information about the consistency group and information about at least one subset of positioning sources within the consistency group: cause the at least one network interface to send, to the base station, a predefined list of subsets of subsets of positioning sources within the consistency group.

In some aspects, the network entity comprises a location server.

In some aspects, the location server comprises a location management function (LMF) or a secure user plane location (SUPL) location platform (SLP).

In an aspect, a user equipment (UE) includes means for identifying a set of positioning sources, each positioning source comprising a positioning reference signal (PRS) resource, a PRS resource set, a PRS frequency layer, a transmission/reception point (TRP), or combinations thereof; means for identifying, from the set of positioning sources, positioning sources that form a consistency group, the consistency group comprising a collection of positioning sources grouped based on an estimated metric of a reference signal of the positioning source, the measured metric for the positioning source, and an error threshold; means for identifying one or more subsets of positioning sources within the consistency group, each subset having an error value; and means for reporting, to a network entity, information about the consistency group and information about at least one of the subsets, wherein the time-angle metric comprises a time of arrival (ToA), an angle of arrival (AoA), a zenith of arrival (ZoA), a time difference of arrival (TDoA), a time of departure (ToD), an angle of departure (AoD), a zenith of departure (ZoD), a reference signal time difference (RSTD), a reference signal received power (RSRP), a round-trip time (RTT), or a combination thereof, and wherein the error threshold comprises a timing threshold, an angle threshold, a received power threshold, or a combination thereof.

In an aspect, a base station includes means for receiving, from a network entity, a set of positioning sources, each positioning source comprising a positioning reference signal (PRS) resource, a PRS resource set, a PRS frequency layer, a transmission/reception point (TRP), or combinations thereof; means for sending, to a user equipment (UE), the set of positioning sources; means for receiving, from the UE, information about a consistency group and information about at least one subset of positioning sources within the consistency group, the consistency group comprising a collection of positioning sources grouped based on an estimated metric of a reference signal of the positioning source, the measured metric for the positioning source, and an error threshold; and means for sending, to the network entity, the information about the consistency group and the information about at least one subset of positioning sources within the consistency group, wherein the time-angle metric comprises a time of arrival (ToA), an angle of arrival (AoA), a zenith of arrival (ZoA), a time difference of arrival (TDoA), a time of departure (ToD), an angle of departure (AoD), a zenith of departure (ZoD), a reference signal time difference (RSTD), a reference signal received power (RSRP), a round-trip time (RTT), or a combination thereof, and wherein the error threshold comprises a timing threshold, an angle threshold, a received power threshold, or a combination thereof.

In an aspect, a location server includes means for sending, to a base station, a set of positioning sources, each positioning source comprising a positioning reference signal (PRS) resource, a PRS resource set, a PRS frequency layer, a transmission/reception point (TRP), or combinations thereof; and means for receiving, from the base station, information about a consistency group and information about at least one subset of positioning sources within the consistency group, the consistency group comprising a collection of positioning sources grouped based on an estimated metric of a reference signal of the positioning source, the measured metric for the positioning source, and an error threshold, wherein the time-angle metric comprises a time of arrival (ToA), an angle of arrival (AoA), a zenith of arrival (ZoA), a time difference of arrival (TDoA), a time of departure (ToD), an angle of departure (AoD), a zenith of departure (ZoD), a reference signal time difference (RSTD), a reference signal received power (RSRP), a round-trip time (RTT), or a combination thereof, and wherein the error threshold comprises a timing threshold, an angle threshold, a received power threshold, or a combination thereof.

In an aspect, a non-transitory computer-readable medium storing computer-executable instructions includes at least one instruction instructing a user equipment (UE) to identify a set of positioning sources, each positioning source comprising a positioning reference signal (PRS) resource, a PRS resource set, a PRS frequency layer, a transmission/reception point (TRP), or combinations thereof; at least one instruction instructing the UE to identify, from the set of positioning sources, positioning sources that form a consistency group, the consistency group comprising a collection of positioning sources grouped based on an estimated metric of a reference signal of the positioning source, the measured metric for the positioning source, and an error threshold; at least one instruction instructing the UE to identify one or more subsets of positioning sources within the consistency group, each subset having an error value; and at least one instruction instructing the UE to report, to a network entity, information about the consistency group and information about at least one of the subsets, wherein the time-angle metric comprises a time of arrival (ToA), an angle of arrival (AoA), a zenith of arrival (ZoA), a time difference of arrival (TDoA), a time of departure (ToD), an angle of departure (AoD), a zenith of departure (ZoD), a reference signal time difference (RSTD), a reference signal received power (RSRP), a round-trip time (RTT), or a combination thereof, and wherein the error threshold comprises a timing threshold, an angle threshold, a received power threshold, or a combination thereof.

In an aspect, a non-transitory computer-readable medium storing computer-executable instructions includes at least one instruction instructing a base station to receive, from a network entity, a set of positioning sources, each positioning source comprising a positioning reference signal (PRS) resource, a PRS resource set, a PRS frequency layer, a transmission/reception point (TRP), or combinations thereof; at least one instruction instructing a base station to send, to a user equipment (UE), the set of positioning sources; at least one instruction instructing the base station to receive, from the UE, information about a consistency group and information about at least one subset of positioning sources within the consistency group, the consistency group comprising a collection of positioning sources grouped based on an estimated metric of a reference signal of the positioning source, the measured metric for the positioning source, and an error threshold; and at least one instruction instructing the base station to send, to the network entity, the information about the consistency group and the information about the at least one subset of positioning sources within the consistency group, wherein the time-angle metric comprises a time of arrival (ToA), an angle of arrival (AoA), a zenith of arrival (ZoA), a time difference of arrival (TDoA), a time of departure (ToD), an angle of departure (AoD), a zenith of departure (ZoD), a reference signal time difference (RSTD), a reference signal received power (RSRP), a round-trip time (RTT), or a combination thereof, and wherein the error threshold comprises a timing threshold, an angle threshold, a received power threshold, or a combination thereof.

In an aspect, a non-transitory computer-readable medium storing computer-executable instructions includes at least one instruction instructing a location server to send, to a base station, a set of positioning sources, each positioning source comprising a positioning reference signal (PRS) resource, a PRS resource set, a PRS frequency layer, a transmission/reception point (TRP), or combinations thereof; and at least one instruction instructing the location server receive, from the base station, information about a consistency group and information about at least one subset of positioning sources within the consistency group, the consistency group comprising a collection of positioning sources grouped based on an estimated metric of a reference signal of the positioning source, the measured metric for the positioning source, and an error threshold, wherein the time-angle metric comprises a time of arrival (ToA), an angle of arrival (AoA), a zenith of arrival (ZoA), a time difference of arrival (TDoA), a time of departure (ToD), an angle of departure (AoD), a zenith of departure (ZoD), a reference signal time difference (RSTD), a reference signal received power (RSRP), a round-trip time (RTT), or a combination thereof, and wherein the error threshold comprises a timing threshold, an angle threshold, a received power threshold, or a combination thereof.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), comprising:
    identifying a set of positioning sources, each positioning source comprising a positioning reference signal (PRS) resource, a PRS resource set, a PRS frequency layer, a transmission/reception point (TRP), or a combination thereof;
    identifying, from the set of positioning sources, positioning sources that form a consistency group, the consistency group comprising a collection of positioning sources grouped based on an expected value of at least one metric of a reference signal from each positioning source, a measured value of the at least one metric for the reference signal from each positioning source, and an error threshold;
    identifying one or more subsets of positioning sources within the consistency group, each subset having at least one metric error value; and
    reporting, to a network entity, information about the consistency group and information about at least one of the subsets of positioning sources within the consistency group; and
    wherein identifying, from the set of positioning sources, positioning sources that form a consistency group, comprises:
    performing a sampling operation a number of times M>1, each sampling operation using a respective sampling subset of the set of positioning sources to identify, as inliers, positioning sources not in the respective sampling subset that have an error less than the error threshold;
    selecting a sampling subset according to a consensus metric;
    identifying, as outliers, positioning sources not in the selected sampling subset that do not have an error less than the error threshold;
    identifying, as the consistency group, the set of positioning sources excluding the outliers; and
    computing a UE position based on values of one or more time-angle metrics from positioning sources selected from a combination of the selected sampling subset and the inliers identified using the sampling subset that produced a largest number of inliers.

2. The method of claim 1, wherein the at least one metric comprises a time of arrival (ToA), an angle of arrival (AoA), a zenith of arrival (ZoA), a time difference of arrival (TDoA), a time of departure (ToD), an angle of departure (AoD), a zenith of departure (ZoD), a reference signal time difference (RSTD), a reference signal received power (RSRP), a round-trip time (RTT), or a combination thereof.

3. The method of claim 1, wherein the error threshold comprises a time-angle threshold.

4. The method of claim 1, wherein identifying the set of positioning sources comprises receiving the set of positioning sources from a base station.

5. The method of claim 1, wherein performing the sampling operation comprises:
    selecting, from the set of positioning sources, a sampling subset;
    estimating, using values for the one or more time-angle metrics from the positioning sources in the sampling subset, a position of the UE;
    computing expected values for the one or more time-angle metrics from the estimated position of the UE to the positioning sources in the set of positioning sources not in the sampling subset;

determining a number of inliers associated with the sampling subset, the inliers comprising positioning sources in set of positioning sources not in the sampling subset that have an error less than the error threshold; and determining an error of the inliers.

6. The method of claim 5, wherein selecting the sampling subset from the set of positioning sources comprises selecting positioning sources within the set of positioning sources to comprise the sampling subset randomly, according to a pseudorandom sequence, or from a predefined list of subsets of positioning sources within the set of positioning sources.

7. The method of claim 1, wherein reporting information about at least one of the subsets of positioning sources within the consistency group comprises identifying the positioning sources included in each subset.

8. The method of claim 1, wherein reporting information about at least one of the subsets of positioning sources within the consistency group comprises reporting an error associated with each subset, reporting an error for each positioning source included in the subset, reporting the error for each positioning source with respect to the error threshold, reporting the error with respect to a consensus value produced by the subset, reporting subsets having an error that satisfies a threshold reporting value, or a combination thereof.

9. A method of wireless communication performed by a base station, comprising:
receiving, from a network entity, a set of positioning sources, each positioning source comprising a positioning reference signal (PRS) resource, a PRS resource set, a PRS frequency layer, a transmission/reception point (TRP), or a combination thereof;
sending, to a user equipment (UE), the set of positioning sources;
receiving, from the UE, information about a consistency group and information about at least one subset of positioning sources within the consistency group, the consistency group comprising a collection of positioning sources grouped based on an expected value of at least one metric of a reference signal from each positioning source, a measured value of the at least one metric for the reference signal from each positioning source, and an error threshold; and
sending, to the network entity, the information about the consistency group and the information about the at least one subset of positioning sources within the consistency group; and
wherein the UE obtained the information by identifying, from the set of positioning sources, positioning sources that form a consistency group, comprises:
performing a sampling operation a number of times M>1, each sampling operation using a respective sampling subset of the set of positioning sources to identify, as inliers, positioning sources not in the respective sampling subset that have an error less than the error threshold;
selecting a sampling subset according to a consensus metric;
identifying, as outliers, positioning sources not in the selected sampling subset that do not have an error less than the error threshold;
identifying, as the consistency group, the set of positioning sources excluding the outliers; and
computing a UE position based on values of one or more time-angle metrics from positioning sources selected from a combination of the selected sampling subset and the inliers identified using the sampling subset that produced a largest number of inliers.

10. The method of claim 9, wherein the at least one metric comprises a time of arrival (ToA), an angle of arrival (AoA), a zenith of arrival (ZoA), a time difference of arrival (TDoA), a time of departure (ToD), an angle of departure (AoD), a zenith of departure (ZoD), a reference signal time difference (RSTD), a reference signal received power (RSRP), a round-trip time (RTT), or a combination thereof.

11. The method of claim 9, wherein the error threshold comprises one or more time-angle thresholds.

12. The method of claim 9, further comprising, prior to receiving information about a consistency group and information about at least one of the subsets of positioning sources within the consistency group from the UE:
receiving, from the network entity, a predefined list of subsets of positioning sources within the set of positioning sources; and
sending, to the UE, the predefined list of subsets of positioning sources within the set of positioning sources.

13. The method of claim 9, wherein the information about at least one of the subsets of positioning sources within the consistency group comprises an error for the at least one subset.

14. The method of claim 9, wherein receiving, from the UE, information about at least one of the subsets of positioning sources within the consistency group comprises receiving information identifying the positioning sources included in each subset.

15. The method of claim 9, wherein receiving, from the UE, information about at least one of the subsets of positioning sources within the consistency group comprises receiving an error associated with each subset, receiving an error for each positioning source included in the subset, receiving the error for each positioning source with respect to the error threshold, receiving the error with respect to a consensus value produced by the subset, receiving information on subsets having an error that satisfies a threshold reporting value Tr, or a combination thereof.

16. A method of wireless communication performed by a network entity, comprising:
sending, to a base station, a set of positioning sources, each positioning source comprising a positioning reference signal (PRS) resource, a PRS resource set, a PRS frequency layer, a transmission/reception point (TRP), or a combination thereof; and
receiving, from the base station, information about a consistency group and information about at least one subset of positioning sources within the consistency group, the consistency group comprising a collection of positioning sources grouped based on an expected value of at least one metric of a reference signal from each positioning source, a measured value of the at least one metric for the reference signal from each positioning source, and an error threshold; and
wherein the UE obtained the information by identifying, from the set of positioning sources, positioning sources that form a consistency group, comprises:
performing a sampling operation a number of times M>1, each sampling operation using a respective sampling subset of the set of positioning sources to identify, as inliers, positioning sources not in the respective sampling subset that have an error less than the error threshold;
selecting a sampling subset according to a consensus metric; identifying, as outliers, positioning sources not in the selected sampling subset that do not have an error less than the error threshold;

identifying, as the consistency group, the set of positioning sources excluding the outliers; and computing a UE position based on values of one or more time-angle metrics from positioning sources selected from a combination of the selected sampling subset and the inliers identified using the sampling subset that produced a largest number of inliers.

17. The method of claim 16, wherein the at least one metric comprises a time of arrival (ToA), an angle of arrival (AoA), a zenith of arrival (ZoA), a time difference of arrival (TDoA), a time of departure (ToD), an angle of departure (AoD), a zenith of departure (ZoD), a reference signal time difference (RSTD), a reference signal received power (RSRP), a round-trip time (RTT), or a combination thereof.

18. The method of claim 16, wherein the error threshold comprises a time-angle threshold.

19. The method of claim 16, further comprising, prior to receiving the information about the consistency group and information about at least one of the subsets of positioning sources within the consistency group, sending, to the base station, a predefined list of subsets of subsets of positioning sources within the consistency group.

20. A user equipment (UE), comprising:
   a memory;
   at least one transceiver; and
   at least one processor communicatively coupled to the memory and the at least one transceiver, the at least one processor configured to:
   identify a set of positioning sources, each positioning source comprising a positioning reference signal (PRS) resource, a PRS resource set, a PRS frequency layer, a transmission/reception point (TRP), or a combination thereof;
   identify, from the set of positioning sources, positioning sources that form a consistency group, the consistency group comprising a collection of positioning sources group based on an expected value of at least one metric of a reference signal from each positioning source, a measured value of the at least one metric for the reference signal from each positioning source, and an error threshold; identify one or more subsets of positioning sources within the consistency group, each subset having at least one metric error value; and
   report, to a network entity, information about the consistency group and information about at least one of the subsets of positioning sources within the consistency group; and
   wherein, to identify, from the set of positioning sources, positioning sources that form a consistency group, the at least one processor is configured to:
   perform a sampling operation a number of times M>1, each sampling operation using a respective sampling subset of the set of positioning sources to identify, as inliers, positioning sources not in the respective sampling subset that have an error less than the error threshold;
   select a sampling subset according to a consensus metric;
   identify, as outliers, positioning sources not in the selected sampling subset that do not have an error less than the error threshold;
   identify, as the consistency group, the set of positioning sources excluding the outliers; and
   compute a UE position based on values of one or more time-angle metrics from positioning sources selected from a combination of the selected sampling subset and the inliers identified using the sampling subset that produced a largest number of inliers.

21. The UE of claim 20, wherein the at least one metric comprises a time of arrival (ToA), an angle of arrival (AoA), a zenith of arrival (ZoA), a time difference of arrival (TDoA), a time of departure (ToD), an angle of departure (AoD), a zenith of departure (ZoD), a reference signal time difference (RSTD), a reference signal received power (RSRP), a round-trip time (RTT), or a combination thereof.

22. The UE of claim 20, wherein the error threshold comprises a time-angle threshold.

23. The UE of claim 20, wherein, to identify the set of positioning sources, the at least one processor is configured to receive the set of positioning sources from a base station.

24. The UE of claim 20, wherein, to perform the sampling operation, the at least one processor is configured to:
   select, from the set of positioning sources, a sampling subset;
   estimate, using values for the one or more time-angle metrics from the positioning sources in the sampling subset, a position of the UE;
   compute expected values for the one or more time-angle metrics from the estimated position of the UE to the positioning sources in set of positioning sources not in the sampling subset;
   determine a number of inliers associated with the sampling subset, the inliers comprising positioning sources in set of positioning sources not in the sampling subset that have an error less than the error threshold; and
   determine an error of the inliers.

25. The UE of claim 24, wherein, to select the sampling subset from the set of positioning sources, the at least one processor is configured to select positioning sources within the set of positioning sources to comprise the sampling subset randomly, according to a pseudorandom sequence, or from a predefined list of subsets of positioning sources within the set of positioning sources.

26. The UE of claim 20, wherein, to report information about at least one of the subsets of positioning sources within the consistency group, the at least one processor is configured to identify the positioning sources included in each subset.

27. The UE of claim 20, wherein, to report information about at least one of the subsets of positioning sources within the consistency group, the at least one processor is configured to report an error associated with each subset, reporting an error for each positioning source included in the subset, reporting the error for each positioning source with respect to the error threshold, reporting the error with respect to a consensus value produced by the subset, or a combination thereof.

28. The UE of claim 20, wherein, to report information about at least one of the subsets of positioning sources within the consistency group, the at least one processor is configured to report subsets having an error that satisfies a threshold reporting value.

* * * * *